US012290916B2

(12) United States Patent
Wipf et al.

(10) Patent No.: US 12,290,916 B2
(45) Date of Patent: May 6, 2025

(54) HANDLING DEVICE AND METHOD FOR HANDLING PRODUCTS, IN PARTICULAR FOOD, BEING CONVEYED BY MEANS OF A TRANSPORT DEVICE

(71) Applicant: Syntegon Packaging Systems AG, Beringen (CH)

(72) Inventors: Alfred Wipf, Jestetten (DE); Markus Wehrli, Schaffhausen (CH); Philipp Kathan, Schaffhausen (CH)

(73) Assignee: Syntegon Packaging Systems AG, Beringen (CH)

( * ) Notice: Subject to any disclaimer, the term of this patent is extended or adjusted under 35 U.S.C. 154(b) by 267 days.

(21) Appl. No.: 17/916,141

(22) PCT Filed: May 26, 2021

(86) PCT No.: PCT/EP2021/063966
§ 371 (c)(1),
(2) Date: Sep. 30, 2022

(87) PCT Pub. No.: WO2021/239768
PCT Pub. Date: Dec. 2, 2021

(65) Prior Publication Data
US 2023/0158681 A1    May 25, 2023

(30) Foreign Application Priority Data
May 26, 2020    (DE) .................... 10 2020 114 084.3

(51) Int. Cl.
*B25J 11/00*       (2006.01)
*B25J 15/06*       (2006.01)
(Continued)

(52) U.S. Cl.
CPC ....... *B25J 11/0045* (2013.01); *B25J 15/0616* (2013.01); *B65B 25/005* (2013.01);
(Continued)

(58) Field of Classification Search
CPC ................... B25J 15/0616; B25J 15/0061; B25J 15/0095; B25J 11/0045; B65G 47/907;
(Continued)

(56) References Cited

U.S. PATENT DOCUMENTS 5,943,842 A * 8/1999 de Koning .............. B65B 35/38
53/247
2016/0159583 A1    6/2016 Keil et al.
(Continued)

FOREIGN PATENT DOCUMENTS

DE          69012532 T2     5/1995
DE     212012000082 U1    12/2013
(Continued)

OTHER PUBLICATIONS

Translation of International Search Report for Application No. PCT/EP2021/063966 dated Sep. 7, 2021 (3 pages).
(Continued)

*Primary Examiner* — Glenn F Myers
(74) *Attorney, Agent, or Firm* — Michael Best & Friedrich LLP

(57) ABSTRACT

A handling device for handling products that are conveyed by a transport device, the handling device including at least one handling unit having a plurality of movably supported movement carriages, and a plurality of handling elements that are embodied as vacuum grippers. The plurality of handling elements move relative to the movement carriages in each case at least substantially parallel to a product support surface of the transport device.

9 Claims, 11 Drawing Sheets

(51) Int. Cl.
 B65B 25/00 (2006.01)
 B65B 35/38 (2006.01)
 B65G 47/91 (2006.01)
 B65G 54/02 (2006.01)

(52) U.S. Cl.
 CPC ............ B65B 35/38 (2013.01); B65G 47/917 (2013.01); B65G 47/918 (2013.01); B65G 54/02 (2013.01)

(58) Field of Classification Search
 CPC ...... B65G 47/918; B65G 47/34; B65G 47/04; B65G 54/02; B65B 25/005
 USPC .................................. 414/627, 749.6, 752.1
 See application file for complete search history.

(56) References Cited

U.S. PATENT DOCUMENTS

| | | | |
|---|---|---|---|
| 2017/0343483 A1 | 11/2017 | Piana et al. | |
| 2017/0369254 A1* | 12/2017 | Muller | B65G 47/082 |
| 2018/0246042 A1 | 8/2018 | Piana | |
| 2019/0315576 A1* | 10/2019 | Torrero | B25J 15/0061 |
| 2019/0388954 A1 | 12/2019 | Stauffer | |
| 2021/0403250 A1 | 12/2021 | Senn et al. | |

FOREIGN PATENT DOCUMENTS

| | | |
|---|---|---|
| DE | 102013107565 A1 | 1/2015 |
| DE | 102014226965 A1 | 6/2016 |
| DE | 102016105570 A1 | 9/2017 |
| DE | 102016108003 A1 | 11/2017 |
| DE | 102016225820 A1 | 6/2018 |
| DE | 102016225888 A1 | 6/2018 |
| DE | 102018219082 A1 | 5/2020 |
| EP | 1803665 A1 | 7/2007 |
| IT | BO20120070 A1 | 8/2013 |
| WO | 2021019012 A1 | 2/2021 |

OTHER PUBLICATIONS

German Patent Office Action for Related Application No. DE 102020114084.3 dated Mar. 5, 2021 (11 pages, including an English translation).

International Search Report and Written Opinion for Related Application No. PCT/EP2021/063966 dated Sep. 7, 2021 (18 pages, including an English translation of the International Search Report).

International Preliminary Report on Patentability for Related Application No. PCT/EP2021/063966 dated Sep. 7, 2022 (19 pages, including an English translation).

* cited by examiner

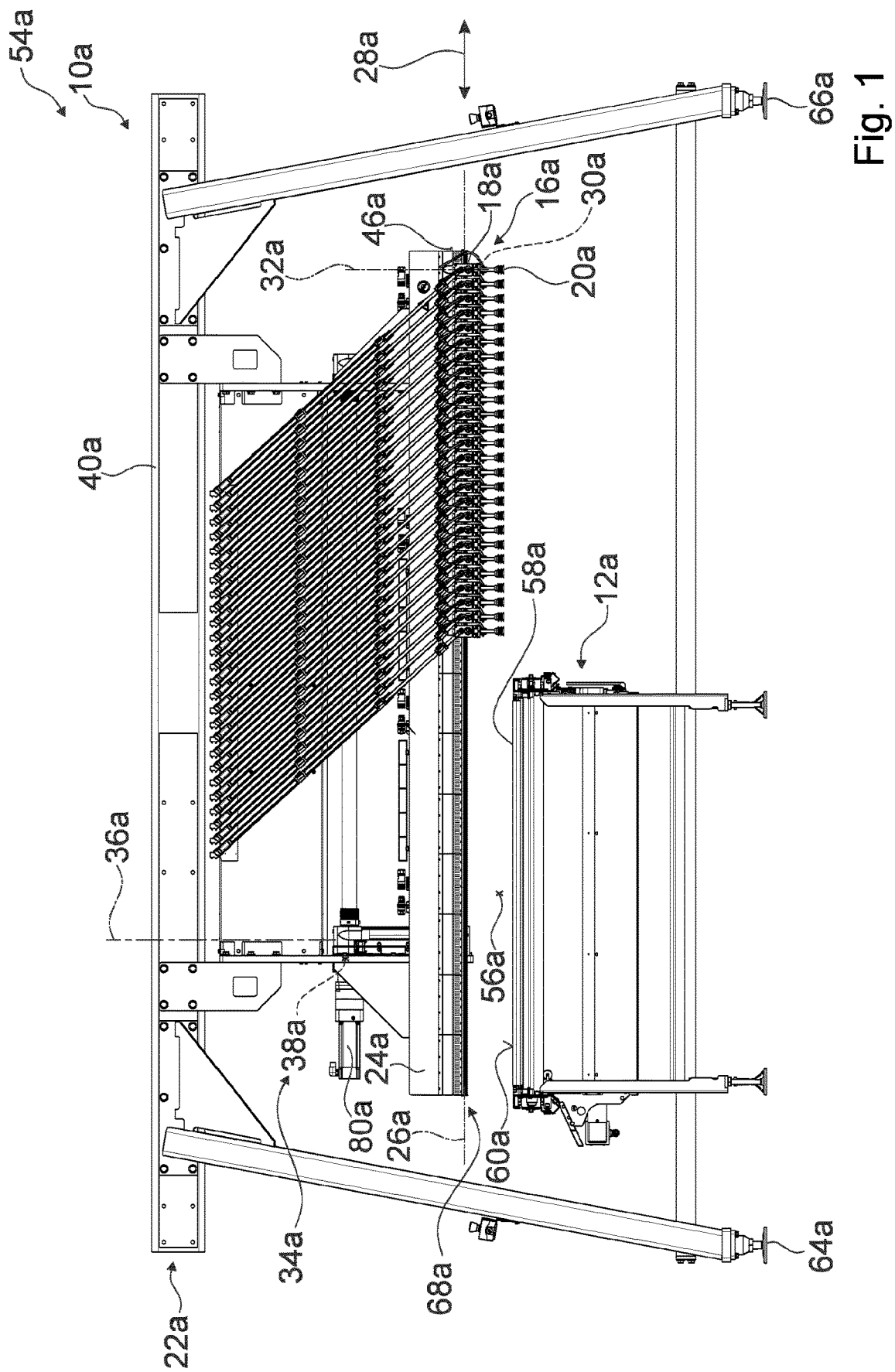

HANDLING DEVICE AND METHOD FOR HANDLING PRODUCTS, IN PARTICULAR FOOD, BEING CONVEYED BY MEANS OF A TRANSPORT DEVICE

CROSS REFERENCE TO RELATED APPLICATIONS

This application is based on and incorporates herein by reference the German patent application DE 10 2020 114 084.3 filed on May 26, 2020 as well as the PCT application PCT/EP2021/063966 filed on May 26, 2021.

BACKGROUND

From EP 1 803 665 B1, DE 10 2016 108 003 A1, DE 10 2016 225 888 A1 and DE 690 12 532 T2 handling devices and methods for a handling of products, in particular food products, which are conveyed by means of a transport device are already known, wherein the handling devices comprise at least one handling unit comprising a plurality of movably supported movement carriages, in particular movers, and a plurality of, in particular movably supported, handling elements, in particular vacuum grippers, wherein respectively at least one handling element is arranged on a movement carriage, and comprising at least one carrier structure, which in particular extends at least partially transversally over the transport device and has at least one carrier element on which the movement carriages are supported, at least along a longitudinal axis of the carrier element, in such a way that they are drivable independently from each other in terms of speed and/or position.

Furthermore, from DE 10 2014 226 965 A1, DE 10 2018 219 082 A1, IT B020 120 070 A1 and WO 2021/019012 A1 handling devices and methods are already known for a handling of products conveyed by means of a transport device, the handling devices having at least one handling unit that comprises a plurality of movably supported movement carriages as well as a plurality of handling elements.

SUMMARY

The invention is based on a handling device for a handling of products, in particular food products, which are conveyed by means of a transport device, with at least one handling unit comprising a plurality of movably supported movement carriages, in particular movers, and a plurality of, in particular movably supported, handling elements which are embodied as vacuum grippers, wherein on each movement carriage in each case at least one handling element is arranged, with at least one carrier structure, which in particular extends at least partially transversally over the transport device and has at least one carrier element on which the movement carriages are supported in such a way that they are drivable independently from each other in terms of speed and/or position, at least along a longitudinal axis of the carrier element, the handling elements being supported on the movement carriages so as to be movable, in particular individually movable, the handling elements in each case having a movement axis that extends transversally to the longitudinal axis of the carrier element, and with at least one electromagnetic drive unit for an individual movement of the movement carriages relative to the carrier element, the electromagnetic drive unit being realized as a linear motor system, wherein the handling unit comprises fluidic drives, in particular hydraulic or pneumatic cylinders, or electromagnetic drives, in particular electromagnetic drives assigned to a further linear motor system of the handling device, for a translational movement of the handling elements along the respective movement axis of the handling elements, wherein respectively one drive is arranged on a movement carriage, wherein the drives are configured at least for a movement of the handling elements, relative to the movement carriages, along a direction that runs at least substantially perpendicularly to the longitudinal axis.

It is proposed that for a movement of the handling elements relative to the movement carriages, the movement axes of the handling elements in each case run at least substantially parallel to a product support surface of the transport device, wherein the carrier structure comprises at least one bearing unit, in particular a rotary bearing unit and/or a linear bearing unit, by means of which the carrier element, in particular together with the movement carriages arranged thereon, is supported so as to be vertically movable. Preferentially the respective movement axis of the handling elements and/or a movement axis of the carrier element run/runs at least substantially perpendicularly to the longitudinal axis of the carrier element. The term "substantially perpendicularly" is here in particular meant to define an orientation of a direction with respect to a reference direction, wherein the direction and the reference direction, in particular viewed in a projection plane, include a 90° angle and the angle has a maximum deviation of in particular less than 8°, advantageously less than 5° and especially advantageously less than 2°.

The carrier element may be realized, for example, as a carrier bar, as a carrier beam, as a carrier cantilever or as another carrier element deemed expedient by someone skilled in the art. Preferably the carrier structure comprises a longitudinal guiding which is arranged on the carrier element, like for example a guiding rail, a ball-guiding rail, a roller guide, a guiding track, a dovetail guide, or the like. The longitudinal guiding may be realized in a one-part implementation with the carrier or element, or the longitudinal guiding may be fastened at the carrier element, in a manner already known to someone skilled in the art, by means of fastening elements, like for example screws, rivets or the like. "In a one-part implementation" is in particular to mean at least connected by substance-to-substance bond, for example by a welding process, a gluing process, an injection-molding process and/or another process deemed expedient by someone skilled in the art. The movement carriages are preferably supported on the carrier element such that they are movable relative to the carrier element. Preferentially the movement carriages are supported on the carrier element such that they are translationally movable via the longitudinal guiding. The movement carriages in each case have a bearing interface realized correspondingly to the longitudinal guiding, like for example one or several rollers, a dovetail guide, sliding pieces or the like. The carrier element may have a closed contour, which is in particular oval, round, polygonal or the like, or an open contour, which is in particular L-shaped, U-shaped, I-shaped, Z-shaped or the like. The longitudinal guiding preferentially has a contour that is at least substantially analogous to the contour of the carrier element, in particular so as to enable a movement of the movement carriages, relative to the carrier element, along an at least substantially entire length of the longitudinal guiding. The movement carriages are supported along the longitudinal axis movably along at least one direction, in two opposed directions or circulating around the carrier element.

Preferentially the handling device comprises a computing unit, which is configured for a control or regulation of a movement of the movement carriages, of the handling elements and/or of the carrier element. A "computing unit" is in particular to mean a controller with a processor, a memory unit and/or an operation program, controlling program and/or computing program stored in the memory unit. "Configured" is in particular to mean specifically designed, specifically implemented, specifically equipped and/or specifically programmed. By an object being configured for a certain function is in particular to be understood that the object fulfills and/or executes said certain function in at least one application state and/or operation state.

The bearing unit may be embodied as a rotary bearing unit and/or as a linear bearing unit. Preferentially the carrier element is supported by the bearing unit so as to be movable rotationally, in particular pivotably, around a movement axis of the carrier element and/or movable translationally along the movement axis of the carrier element, in particular movable relative to a carrier frame of the carrier structure and/or to the transport device. Preferably the bearing unit is implemented, in particular in addition to a vertically movable support of the carrier element, for a horizontally movable support of the carrier element. Preferentially the carrier element is supported by the bearing unit, in particular in addition to a movable support around and/or along the movement axis of the carrier element, so as to be movable rotationally, in particular pivotably, around a further movement axis and/or movable translationally along the further movement axis, in particular movable with respect to the carrier frame of the carrier structure and/or to the transport device. The term "supported so as to be vertically movable" is in particular to mean a movable support of an element and/or a unit wherein, in a movement of the element and/or of the unit, the element and/or the unit have/has at least one movement component, in particular main movement component, extending in a vertical direction. The term "supported so as to be horizontally movable" is in particular to mean a movable support of an element and/or a unit wherein, in a movement of the element and/or of the unit, the element and/or the unit have/has at least one movement component, in particular main movement component, extending in a horizontal direction.

The carrier element, in particular together with the movement carriages movably supported thereon, is preferably arranged at least largely above the transport device, in particular above a product support surface of the transport device, in particular viewed along a direction running at least substantially perpendicularly to the product support surface. It is however also conceivable that the carrier element, in particular together with the movement carriages which are supported movably thereon, is arranged at least partially sidewise next to the transport device, in particular for an away transport of products taken from the transport device by the handling elements. It is conceivable that the carrier element or at least the guiding track has an offset or a ledge with respect to a height level of the carrier element or of the guiding track, in particular for depositing picked-up products in a plane offset from the product support surface in a buffer, to transfer such products to a collecting container, to transfer such products to a further transport device, or the like. By a "product" is in particular an object to be understood that is to be packaged, in particular a non-packed object, or a packaging that contains at least one object or is empty, like for example a biscuit, a chocolate bar, a carton, a container, a tray, a foil package, like for example a tubular bag, or the like. The handling device may preferentially be configured to enter objects and/or trays and/or foil packagings containing objects and/or stacks of objects and/or trays and/or foil packages into a packaging process of a packaging machine.

The transport device is preferentially realized as a conveyor belt device. However, it is also conceivable that the transport device has a different implementation deemed expedient by someone skilled in the art, like for example an implementation as a roller conveyor device, as a chain conveyor device or the like. The transport device preferably has a main transport direction, in particular a main transport direction along which the products are conveyed by the transport device. The main transport direction preferably runs at least substantially parallel to the product support surface. "Substantially parallel" is here in particular to mean an orientation of a direction relative to a reference direction, in particular in a plane, wherein the direction has a deviation from the reference direction that is in particular smaller than 8°, advantageously smaller than 5° and particularly advantageously smaller than 2°. The carrier element is preferentially supported by the bearing unit such that it is movable transversally to the main transport direction.

The carrier element, in particular the longitudinal axis of the carrier element, is preferably oriented transversally to the main transport direction. It is however also conceivable, in particular in an alternative implementation of the handling device, that the carrier element, in particular the longitudinal axis of the carrier element, is oriented at least substantially parallel to the main transport direction, in particular entirely or at least partly. In particular, the carrier element is supported by the bearing unit so as to be movable at least substantially perpendicularly to the product support surface. Preferentially, in a movement of the carrier element relative to the transport device, the carrier element has a movement component that runs at least substantially perpendicularly to the product support surface. Preferably the movement axis of the carrier element runs transversally, in particular at least substantially perpendicularly, to the main transport direction. The further movement axis of the carrier element preferably runs at least substantially parallel to the main transport direction. The movement carriages are, in particular due to their movable support at the carrier element, preferably supported so as to be movable, relative to the transport device, along a direction running transversally, in particular at least substantially perpendicularly, to the main transport direction.

It is however also conceivable, in particular in an alternative implementation of the handling device, that the movement carriages are supported so as to be movable relative to the transport direction, in particular completely or at least section-wise along the longitudinal guiding track, along a direction running at least substantially parallel to the main transport direction, in particular depending on an orientation of the carrier element or of the longitudinal guiding at the carrier element relative to the transport device.

The handling device preferably comprises at least one electromagnetic drive unit for an individual movement of the movement carriages relative to the carrier element. Preferably the electromagnetic drive unit is embodied as a linear motor system. Preferentially the linear motor system comprises, at least along the longitudinal axis of the carrier element, a stator and a plurality of independently drivable translators, which are arranged at the movement carriages and are configured to drive the movement carriages independently from one another. A "linear motor system" is to mean, in this context, a system comprising at least one stator and a plurality of movable translators which are drivable along the stator, which are arranged on the movement carriages and are configured to drive the movement carriages independently from one another. By a "linear motor system" is in this context a system to be understood which comprises at least one stator and a plurality of movable translators which are drivable along the stator. The stator may extend along a straight line but may also extend along a curve and/or a circular path. Preferentially the stator follows a contour of the longitudinal axis of the carrier element and/or a contour of the carrier element itself. The stator may be implemented as a secondary part, preferentially as a primary part, of the linear motor system. Preferentially the stator comprises stator windings which are at least section-wise independently actuatable. A magnetic traveling wave field can be generated independently for each translator that is situated in the influence range of the stator. The translators are drivable independently. The translators may be realized as primary parts, preferentially as secondary parts, of the linear motor system. Preferentially the translators comprise permanent magnets. The translators may be implemented in a passive manner. Moved lines for a power transfer to the translators may be done without. Preferentially the linear motor system comprises route and/or position measuring elements, which are configured for measuring the positions and/or speeds of the translators relative to the stator. Preferentially the computing unit is configured to control or regulate position and/or speed of the translators. Such linear motor systems with independently drivable translators are known to someone skilled in the art. In particular, at least two translators are arranged on at least one movement carriage. However, it is alternatively also conceivable that the handling device comprises a different drive unit, deemed expedient by someone skilled in the art, for driving the movement carriages relative to the carrier element, like for example a toothed rod drive unit, a belt drive unit, or the like.

The handling elements are preferably embodied as vacuum grippers. It is however also conceivable that the handling elements have a different implementation deemed expedient by someone skilled in the art, like for example an implementation as mechanical grippers, as magnetic grippers, as stack suctioners, or the like. Preferably, at one individual movement carriage one individual handling element is arranged. It is however also conceivable that at one individual movement carriage a plurality of handling elements are arranged, like for example at least two, three, four, five or more handling elements. Preferentially the movement axes of the handling elements run in each case at least substantially perpendicularly to the longitudinal axis of the carrier element. The movement axes of the handling elements for a movement of the handling elements relative to the movement carriages preferably run in each case in at least one implementation of the handling device and/or in at least one section of the longitudinal guiding at least substantially parallel to the main transport direction, in particular depending on an orientation of the carrier element or of the longitudinal guiding at the carrier element relative to the transport direction. Alternatively or additionally the handling elements in each case have a movement axis, in particular a further movement axis, for an alternative or additional movement of the handling elements relative to the movement carriages. The, in particular further, movement axes of the handling elements for an, in particular alternative or additional, movement of the handling elements relative to the movement carriages preferably run in each case, in at least one implementation of the handling device and/or in at least one section of the longitudinal guiding, at least substantially perpendicularly to the product support surface and to the longitudinal axis of the carrier element. Preferably the handling elements are configured for a conveying away of products, by means of the movement carriages, on at least one side of the transport device. It is however also conceivable that the handling elements are configured for a conveying away of products by means of the movement carriages on two mutually facing-away sides, i. e. on both sides, of the transport device.

By the implementation of the handling device according to the invention, advantageously a high degree of flexibility is achievable regarding a handling of products conveyed by the transport device. Advantageously, high-grade performance is achievable with low space requirements of the handling device. Positioning of each individual handling element, adapted individually to a position of a product on the transport device, is achievable in a constructionally simple manner. Especially advantageously, efficient handling of products which are delivered on the transport device in a non-sorted manner is enabled. Advantageously, individual buffer loading can be realized in order to enable advantageously high throughput of products. In a constructionally simple manner, sidewise conveying away as well as pre-sorting, grouping and/or shingling of products which are delivered on the transport device in a non-sorted manner is facilitated.

It is further proposed that the handling elements are supported at the movement carriages so as to be movable, in particular individually movable, translationally along and/or rotationally around the respective movement axis. Preferentially handling elements are supported at the movement carriages so as to be movable independently from one another, relative to the movement carriages, translationally along and/or rotationally around the movement axes. The handling elements are preferably supported so as to be translationally movable, relative to the movement carriages, along the movement axes, the movement axes running at least substantially perpendicularly to the longitudinal axis of the carrier element, in particular additionally at least substantially parallel or transversally to the main transport direction. Alternatively or additionally the handling elements are supported so as to be rotationally movable, relative to the movement carriages, around the movement axes, the movement axes running at least substantially perpendicularly to the longitudinal axis of the carrier element, in particular additionally at least substantially parallel or transversally to the main transport direction. In at least one implementation of the handling device, the handling elements may have the further movement axes, the handling elements being supported at the movement carriages so as to be movable, in particular individually movable, relative to the movement carriages, translationally along said further movement axes in a direction running at least substantially perpendicularly to the product support surface and to the longitudinal axis of the carrier element. By the implementation of the handling device according to the invention, it is advantageously possible to attain a high degree of flexibility with regard to a handling of products conveyed via the transport device. Advantageously high-grade performance is achievable with low space requirements of the handling device. Positioning of each individual handling element, adapted individually to a position of a product on the transport device, is achievable in a constructionally simple manner. Especially advantageously, efficient handling is enabled of products which are delivered on the transport device in a non-sorted manner. Advantageously, individual buffer loading can be realized in order to enable an advantageously high throughput of products. This enables sidewise conveying away as well as pre-sorting, grouping and/or shingling of products which are delivered on the transport device in a non-sorted manner.

Furthermore, it is proposed that the carrier element is supported by the bearing unit on a carrier frame of the carrier structure so as to be vertically movable translationally along and/or rotationally around an, in particular the aforementioned, movement axis of the carrier element, which runs transversally to the longitudinal axis of the carrier element. Preferably the carrier element is supported by the bearing unit at the carrier frame so as to be movable translationally along the movement axis of the carrier element at least in a direction that runs at least substantially perpendicularly to the product support surface. Alternatively or additionally, the carrier element is supported by the bearing unit at the carrier frame so as to be movable rotationally, in particular pivotably, around the movement axis of the carrier element, at least in a plane extending at least substantially parallel to the product support surface. Preferentially, in at least one implementation of the handling device, the carrier element comprises at least the further movement axis, which in particular runs at least substantially perpendicularly to the longitudinal axis of the carrier element, the carrier element being supported on the carrier frame so as to be movable around said further movement axis rotationally, in particular pivotably, in a plane extending at least substantially perpendicularly to the product support surface. Alternatively, in at least one implementation of the handling device, in particular in at least one implementation of the handling device in which the longitudinal axis of the carrier element is oriented at least substantially parallel to the main transport direction, the carrier element is supported on the carrier frame so as to be movable translationally along a movement axis of the carrier element which extends at least substantially perpendicularly to the longitudinal axis of the carrier element and at least substantially perpendicularly to the main transport direction, and/or movable rotationally around a further movement axis of the carrier element extending at least substantially parallel to the longitudinal axis of the carrier element and at least substantially parallel to the main transport direction. An implementation of the handling device according to the invention advantageously enables individual adaption of the handling device to product sizes, in particular product heights, of products transported on the transport device. For example, for maintenance or for servicing, easy accessibility of the transport device, which is arranged underneath the handling device, is advantageously enabled, in particular as the carrier element, together with the movement carriages which are movably supported thereon, can be moved away from the transport device in a comfortable manner. Advantageously a high degree of flexibility is achievable with regard to a handling of products conveyed by the transport device. Advantageously, high-grade performance is achievable with low space requirements of the handling device. It is possible to obtain, in a constructionally simple manner, a positioning of each individual handling element which is individually adapted to a position of a product on the transport device. Especially advantageously, efficient handling is enabled of products delivered on the transport device in an unsorted manner.

Preferentially, each handling element is assigned at least one individual drive, which is arranged on the movement carriage and is in particular supported by means of the movement carriage so as to be movable relative to the carrier element. The drives may be embodied as hydraulic or pneumatic cylinders, as electromotors, as electromagnets, as permanent magnets or as other drives which are deemed expedient by someone skilled in the art. In particular, it is conceivable that the drives are embodied as electromagnetic drives and as part of a further linear motor system of the handling device. Preferably the drives are configured to drive the handling elements directly for a translational movement of the handling elements along the movement axes of the handling elements, which run at least substantially perpendicularly to the longitudinal axis of the carrier element. The drives are preferably actuatable individually, in particular in order to realize an individual movement of the handling elements relative to each other. It is conceivable that for a movement conversion of the drives, the handling unit comprises in each case a gear that is assigned to the respective drive and is arranged at the movement carriages for a translational and/or rotational movement of the handling elements relative to the movement carriages. Preferably, the drives are configured at least for a movement of the handling elements relative to the movement carriages along a direction running at least substantially perpendicularly to the longitudinal axis, in particular additionally along a direction running at least substantially parallel to the product support surface. The drives or further drives of the handling unit may additionally be configured for a movement of the handling elements along a direction running at least substantially perpendicularly to the product support surface. Alternatively it is also conceivable that, for a movement of the handling elements along the direction running at least substantially perpendicularly to the product support surface, the handling unit comprises a cam control for a vertical movement of the handling elements relative to the movement carriages, wherein cams of the cam control are arranged on the guiding track, in particular in such a way that a vertical movement of the handling elements relative to the movement carriages is realized depending on a position and/or movement of the movement carriages relative to the carrier element. The implementation of the handling device according to the invention allows realizing, in a constructionally simple manner, an individual movement of the handling elements relative to the movement carriages. A high degree of flexibility regarding a handling of products conveyed by the transport device is advantageously achievable. Advantageously, high-grade performance is achievable with low space requirements of the handling device. Positioning of each individual handling element, individually adapted to a position of a product on the transport device, is achievable in a constructionally simple manner. Efficient handling of products, delivered on the transport device in a non-sorted manner, is particularly advantageously achievable.

Furthermore, in particular in at least one implementation of the handling device, it is proposed that the handling device comprises at least one, sliding-contact-based or contactless, in particular inductive, energy supply unit for an energy supply of the electrical and/or magnetic drives, the energy supply unit being integrated at least partially in the carrier element or at least partially in an, in particular the aforementioned, guiding track of the handling unit. Preferably the energy supply unit comprises a plurality of energy pickups, wherein in each case at least one energy pickup is arranged on an individual movement carriage. The energy pickups may be embodied as sliding contacts, as coils, or the like. The energy supply unit preferentially comprises an energy output element, which is for example embodied as a contact path, in particular as a copper path, as a coil, or the like, and is arranged at the carrier element. The implementation of the handling device according to the invention allows realizing, in a constructionally simple manner, an energy transfer to the movable elements of the handling unit, in particular free of a cable connection between the energy supply unit and the movement carriages which are supported movably at the carrier element. An individual movement of the handling elements relative to the movement carriages can be realized in a constructionally simple manner. A high degree of flexibility with regard to a handling of products conveyed by the transport device is advantageously achievable. Positioning of each individual handling element, individually adapted to a position of a product on the transport device, is achievable in a constructionally simple manner. Efficient handling of products, delivered on the transport device in a non-sorted manner, is particularly advantageously achievable.

It is also proposed that the handling device comprises at least one detection unit for a detection of orientations and/or positions of products on the transport device, wherein the handling elements are individually movable, relative to the movement carriages, depending on orientations and/or positions of products on the transport device captured by the detection unit, along and/or around the respective movement axis of the handling elements. Alternatively or additionally, the detection unit is configured for a detection of a quality of products. It is for example conceivable that the detection unit detects, alternatively or additionally, whether products are realized good or bad, in particular free of deficiencies. The handling elements are preferably actuatable in such a way that a handling by the handling elements is carried out only for products sensed to be good, the products that are sensed to be bad being further transportable by means of the transport device. If during a handling process not by all handling element a product is taken from the transport device, it is conceivable that additionally products are picked up from a buffer by at least one of the handling elements. Advantageously a full number of products that are to be transported away is enabled. The detection unit is preferably implemented as an optical detection unit like for example as a camera unit, as a light barrier, or the like. Preferentially the detection unit is configured to capture a total width of the product support surface, the detection unit comprising at least one individual detection element, in particular a single camera or a single optical sensor, for capturing the total width. It is however also conceivable that the detection unit is configured to capture individual rows of products on the product support surface, and in particular comprises one individual detection element per row. Preferentially, in particular viewed along the main transport direction, the detection unit is situated upstream of the handling unit. Preferably, for a transfer of electronic data, the detection unit is connected with the computing unit. In particular, the computing unit evaluates the data captured by the detection unit and controls or regulates a movement of the movement carriages, of the handling elements and/or of the carrier element depending on orientations and/or positions of products on the transport device captured by the detection unit. Preferably the computing unit evaluates the data captured by the detection unit and evaluates a quality of products conveyed by the transport device. It is preferably possible to control or regulate by means of the computing unit a movement of the movement carriages, of the handling elements and/or of the carrier element depending on orientations and/or positions of products on the transport device, captured by the detection unit, and/or depending on a quality of products conveyed by the transport device. The implementation of the handling device according to the invention allows, in a constructionally simple manner, realizing an individual movement of the handling elements relative to the movement carriages depending on orientations and/or positions of products. A high degree of flexibility with regard to a handling of products conveyed by the transport device is advantageously achievable. Positioning of each individual handling element, individually adapted to a position of a product on the transport device, is achievable in a constructionally simple manner. Efficient handling of products, delivered on the transport device in a non-sorted manner, is particularly advantageously facilitated.

Beyond this it is proposed that the handling device comprises at least one vacuum unit, in particular a vacuum unit having at least substantially no feed hose to the movement carriages and/or to the handling elements, for creating a negative pressure at the handling elements for holding at least one product at the handling elements, the vacuum unit being integrated at least partially in the carrier element or at least partially in an, in particular the aforementioned, guiding track of the handling unit. Particularly preferentially, the vacuum unit is realized according to an implementation of a vacuum unit known from the document DE 10 2016 225 820 A1 such that, at least with respect to the disclosure of the vacuum unit, the contents of the document DE 10 2016 225 820 A1 shall be regarded as part of the present disclosure. Preferably, in the carrier element or in the guiding track at least one negative-pressure channel is arranged, which is capable of fluidically communicating with the movement carriages via individually openable and closable negative-pressure openings, in particular in accordance with the disclosure of the document DE 10 2016 225 820 A1. The handling elements may be fluidically connected to the movement carriages via a vacuum connection line, like for example a vacuum hose or the like, or the handling elements may be fluidically connected to the movement carriages analogously to the fluidic communication between the negative-pressure openings and the movement carriages, i. e. via negative-pressure openings which are openable or closable, in particular by means of a strap or the like, depending on a position of the handling elements relative to the movement carriages. However, it is also conceivable that the vacuum unit has a different implementation deemed expedient by someone skilled in the art, like for example an arrangement of a vacuum channel in the carrier element, which is connected to the individual handling elements via vacuum lines, or something like that. The implementation of the handling device according to the invention advantageously allows realizing a negative-pressure generation at movable elements of the handling unit, which is in particular free of a flexible hose connection between the negative-pressure channel arranged in the carrier element or in the guiding track and the movement carriages supported movably at the carrier element and/or the handling elements. Advantageously a high degree of flexibility is achievable with regard to a handling of products conveyed by the transport device. Efficient handling of products, delivered on the transport device in a non-sorted manner, is particularly advantageously achievable.

The invention is furthermore based on a method for a handling of products by means of a handling device according to the invention, wherein in at least one method step the handling elements of the handling unit of the handling device are moved, in particular individually, at the movement carriages of the handling unit along the movement axis of the handling elements that runs at least substantially perpendicularly to the longitudinal axis of the carrier element, wherein for a movement of the handling elements relative to the movement carriages, the movement axes of the handling elements in each case run at least substantially parallel to a product support surface of a transport device, wherein the individual movement of the movement carriages relative to the carrier element is realized by means of at least one electromagnetic drive unit of the handling device that is embodied as a linear motor system, wherein a translational movement of the handling elements along the respective movement axis of the handling elements is realized by means of fluidic drives, in particular hydraulic or pneumatic cylinders, or by means of electromagnetic drives of the handling unit, in particular electromagnetic drives of the handling unit which are assigned to a further linear motor system of the handling device, wherein respectively one drive is arranged on each movement carriage, wherein in at least the method step the carrier element of the carrier structure is moved vertically, in particular together with the movement carriages that are arranged thereon. The handling elements are preferably moved, in particular individually, relative to the movement carriages translationally along and/or rotationally around the movement axes. Preferentially handling elements are moved relative to the movement carriages translationally along and/or rotationally around the movement axes independently from one another. Preferentially the carrier element is moved by means of the bearing unit vertically at the carrier frame of the carrier structure translationally along an, in particular the aforementioned, and/or rotationally around an, in particular the aforementioned, movement axis of the carrier element that runs transversally to the longitudinal axis of the carrier element. Regarding further method steps concerning a movement of the handling element, of the movement carriages and/or of the carrier element, the movable support of the handling elements, of the movement carriages and of the carrier element, already explained regarding the handling device, is referred to, which shall analogously also be read on to the method steps concerning a movement of the handling elements, of the movement carriages and/or of the carrier element. The implementation of the method according to the invention advantageously allows obtaining a high flexibility regarding a handling of products conveyed by the transport device. Advantageously, high-grade performance is achievable, in particular as advantageously several products can be handled simultaneously. Positioning of each individual handling element, individually adapted to a position of a product on the transport device, is achievable in a constructionally simple manner. Efficient handling of products, delivered on the transport device in a non-sorted manner, is particularly advantageously facilitated. It is advantageously possible to realize individual buffer loading so as to enable an advantageously high throughput of products. Reliable and precise sidewise conveying away as well as pre-sorting, grouping and/or shingling of products delivered on the transport device in in a non-sorted manner is advantageously enabled.

It is also proposed that in at least one method step the handling elements are moved individually, relative to the movement carriages, depending on orientations and/or positions of products on the transport device captured by a detection unit, in particular the aforementioned detection unit, of the handling device, along and/or around the movement axes of the handling elements. Preferably the detection unit transmits in at least one preceding method step data, in the form of electronic data captured by the detection unit, to an, in particular the aforementioned, computing unit of the handling device. In particular, the computing unit evaluates the data captured by the detection unit and controls or regulates a movement of the movement carriages, the handling elements and/or the carrier element depending on orientations and/or positions of products on the transport device which were captured by the detection unit. Preferably the computing unit evaluates the data captured by the detection unit and assesses a quality of products conveyed by the transport device. A movement of the movement carriages, the handling elements and/or the carrier element is preferably controlled or regulated by the computing unit depending on orientations and/or positions of products on the transport device captured by the detection unit, and/or depending on a quality of products conveyed by the transport device. The implementation according to the invention advantageously allows realizing an individual movement of the handling elements relative to the movement carriages depending on orientations and/or positions of products. It is advantageously possible to attain a high flexibility with regard to a handling of products conveyed by the transport device. Positioning of each individual handling element, adapted individually to a position of a product on the transport device, is advantageously achievable. Especially advantageously, efficient handling of products which are delivered on the transport device in a non-sorted state is enabled.

Beyond this, the invention is based on a packaging machine system with at least one handling device according to the invention and with at least one transport device, in particular a conveyor belt device, for a transport of products, wherein the transport device has an, in particular the aforementioned, main transport direction, wherein the handling device at least partially extends transversally, in particular transversally to the main transport direction, over a transport element, in particular a conveyor belt, of the transport device, wherein the handling elements are supported at the movement carriages movably, in particular individually movably, along the movement axis of the handling elements which runs at least substantially parallel to the main transport direction, wherein the carrier structure comprises at least the bearing unit, in particular a rotary bearing unit and/or a linear bearing unit, by means of which the carrier element, in particular together with the movement carriages arranged thereon, is supported movably along an, in particular the aforementioned, movement axis of the carrier element which runs transversally to the main transport direction, and/or around an, in particular the aforementioned, movement axis of the carrier element which runs at least substantially parallel to the main transport direction. The handling device may extend completely transversally over the transport device or may extend only partially transversally over the transport device. Preferably the handling device, in particular at least the handling unit and/or the carrier element, extends sidewise beyond the transport device, in particular in order to enable a transfer of products, picked up from the transport device by the handling device, to a packaging machine and/or to a buffer or the like. The implementation of the packaging machine system according to the invention advantageously allows achieving a high degree of flexibility with regard to a handling of products conveyed by the transport device. Advantageously, high-grade performance is attainable with low space requirements of the packaging machine system. Positioning of each individual handling element, adapted individually to a position of a product on the transport device, is achievable in a constructionally simple manner. Especially advantageously, efficient handling of products which are delivered on the transport device in a non-sorted manner is facilitated. Advantageously, individual buffer loading can be realized in order to enable an advantageously high throughput of products. Sidewise conveying away as well as pre-sorting, grouping and/or shingling of products which are delivered on the transport device in an unsorted state is enabled in a constructionally simple manner.

The handling device according to the invention, the method according to the invention and/or the packaging machine system according to the invention shall herein not be limited to the application and implementation described above. In particular, in order to fulfill a functionality that is described here, the handling device according to the invention, the method according to the invention and/or the packaging machine system according to the invention may comprise a number of individual elements, components and units as well as method steps that differs from a number given here. Moreover, with regard to the value ranges given in the present disclosure, values within the limits given shall also be considered as disclosed and as utilizable according to requirements.

BRIEF DESCRIPTION OF THE DRAWINGS

Further advantages will become apparent from the following description of the drawing. In the drawing exemplary embodiments of the invention are illustrated. The drawing, the description and the claims contain a plurality of features in combination. Someone skilled in the art will purposefully also consider the features separately and will find further expedient combinations.

It is shown in:

FIG. 1 a schematic illustration of a packaging machine system according to the invention, with a transport device and with a handling device according to the invention for a handling of products conveyed by the transport device, FIG. 2a a detailed view of the handling device in a schematic illustration, wherein handling elements of the handling device are movably supported along a vertical direction relative to a carrier element of the handling device, FIG. 2b a detailed view of an alternative embodiment of the handling device in a schematic illustration, wherein handling elements of the handling device are movably supported together with a carrier element of the handling device along a vertical direction, FIG. 3 a schematic top view of the packaging machine system according to the invention, FIG. 4 a flow chart of a method according to the invention for a handling of products by means of the handling device according to the invention, FIG. 5 a schematic illustration of an alternative packaging machine system according to the invention, with a transport device and with a handling device according to the invention for a handling of products conveyed by the transport device, FIG. 6 a schematic illustration of a further alternative packaging machine system according to the invention, with a transport device and with a handling device according to the invention for a handling of products conveyed by means of the transport device, FIG. 7 a schematic illustration of an additional further alternative packaging machine system according to the invention, with a transport device and with a handling device according to the invention for a handling of products conveyed by means of the transport device, FIG. 8 a top view of the additional further alternative packaging machine system of FIG. 7, FIG. 9 a schematic illustration of movement options of handling elements of handling units of the handling devices according to the invention, FIG. 10 a schematic illustration of movement options of handling elements of handling units of the handling devices according to the invention for a grouping and/or orientation of products, FIG. 11 a possible arrangement of a carrier element of the handling devices according to the invention, in a schematic illustration, FIG. 12 a further possible arrangement of a carrier element of the handling devices according to the invention, in a schematic illustration, FIG. 13a an additional further possible arrangement of a carrier element of the handling devices according to the invention, in a schematic illustration, and FIG. 13b a view along a main transport direction onto the arrangement of the carrier element of FIG. 13a.

DETAILED DESCRIPTION

Figure 3:
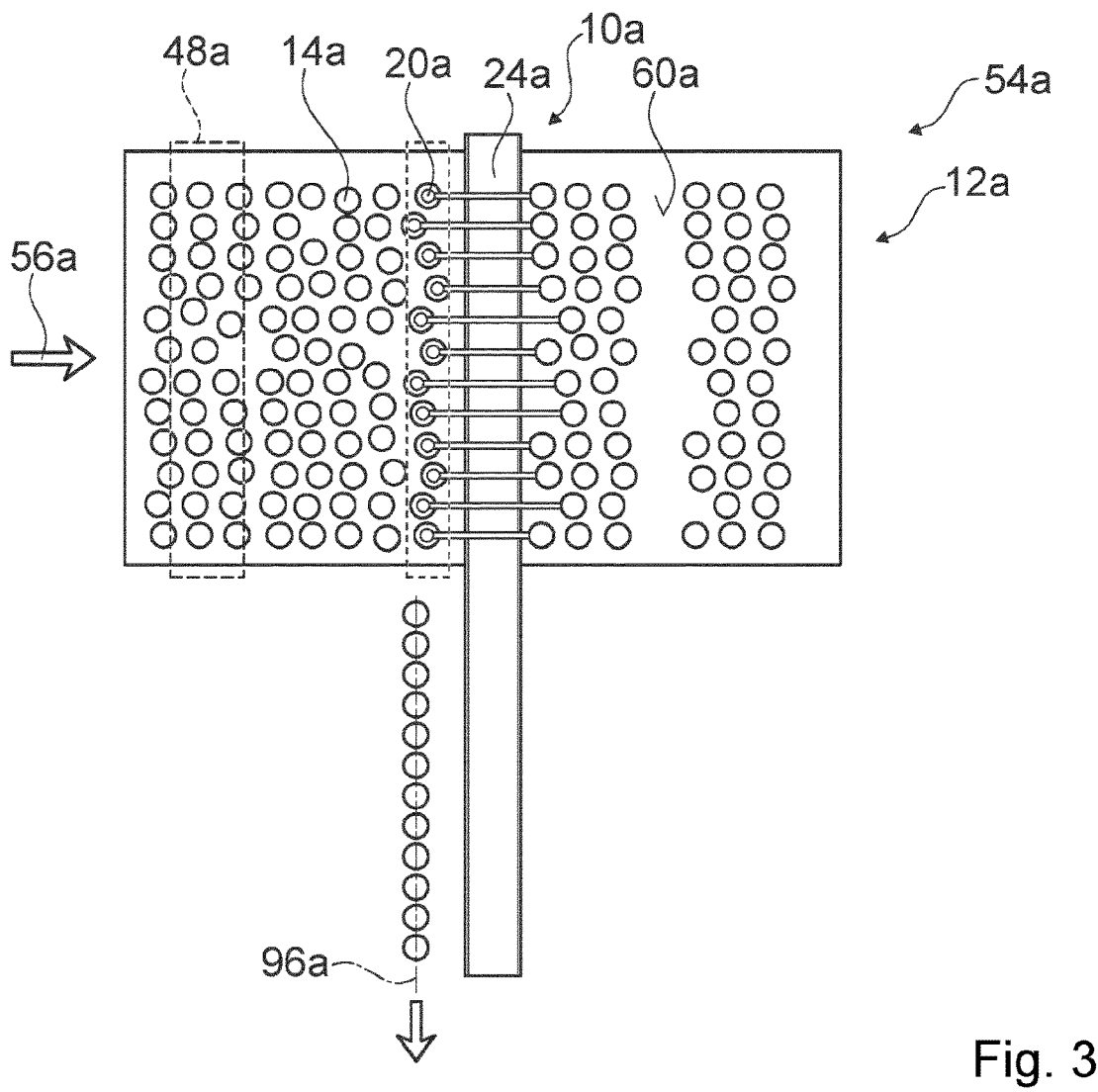

FIG. 1 shows a packaging machine system 54a with a transport device 12a and with a handling device 10a for a handling of products 14a conveyed by the transport device 12a (see FIG. 3). The transport device 12a is preferentially embodied as a conveyor belt device. It is however also conceivable that the transport device 12a has a different implementation that is deemed expedient by someone skilled in the art, like for example an implementation as a roller conveyor device, as a chain conveyor device, as a slat conveyor device, or something like that. The transport device 12a has a main transport direction 56a, along which the products 14a are conveyable by means of the transport device 12a, in particular by means of a transport element 58a of the transport device 12a which is realized as a conveyor belt. The main transport direction 56a preferably runs at least substantially parallel to a product support surface 60a of the transport device 12a. The product support surface 60a is embodied as a surface of the transport element 58a that is realized as a conveyor belt. In a state of the products 14a when they are conveyed by the transport device 12a, the products 14a which are conveyable by the transport device 12a are arranged on the product support surface 60a. In a state of the products 14a when they are conveyed by the transport device 12a, the products 14a which are conveyable by the transport device 12a are adjacent to the product support surface 60a. The products 14a are preferably fed to the handling device 10a from at least one product production machine (not shown here) by means of the transport device 12a. The product production machine is preferably realized as a food production machine. It is however also conceivable that the product production machine is realized as a different product production machine deemed expedient by someone skilled in the art. Preferentially, by means of the product production machine products 14a are produced which are embodied as food products, in particular sweets, like chocolate bars, chocolate slabs, chocolate cookies, cookies, biscuits or the like. The products 14a may be arranged on the product support surface 60a as, in particular non-sorted, individual products, or the products 14a may be arranged in production molds, like for example chocolate glaze molds or the like. By means of the handling device 10a, the products 14a are transferred to at least one packaging machine (not shown here in detail) for secondary packaging, single packaging or for a different type of packaging of the products 14a that is deemed expedient by someone skilled in the art. The packaging machine may be embodied as a tubular-bag machine, as a cardboard packaging machine or as a different packaging machine that is deemed expedient by someone skilled in the art.

The handling device 10a at least partially extends transversally, in particular transversally to the main transport direction 56a, over the transport element 58a, in particular the conveyor belt, of the transport device 10a. It is conceivable that the handling device 10a extends completely over a total width of the transport device 12a, or that the handling device 10a extends only partially over the total width of the transport device 12a. The total width of the transport device 12a preferably extends at least substantially perpendicularly to the main transport direction 56a, in a plane extending at least substantially parallel to the product support surface 60a. The handling device 10a for a handling of products 14a, in particular food products, conveyed by means of the transport device 12a has at least one handling unit 16a comprising a plurality of movably supported movement carriages 18a, in particular movers, and a plurality of, in particular movably supported, handling elements 20a, in particular vacuum grippers, wherein respectively at least one, in particular individual, handling element 20a is arranged on each movement carriage 18a. It is however also conceivable that a plurality of handling elements 20a is arranged on each movement carriage 18a, depending on an application area of the handling unit 16a.

The handling device 10a comprises at least one carrier structure 22a, which in particular extends at least partially transversally over the transport device 12a and comprises at least one carrier element 24a, which the movement carriages 18a are supported on in such a way that they are drivable independently from each other in terms of speed and/or position, at least along a direction 28a running at least substantially parallel to a longitudinal axis 26a of the carrier element 24a. The carrier structure 22a may be embodied as a main frame, as a machine frame, as a main housing or as a different structure that is deemed expedient by someone skilled in the art and is configured to support bearing loads of the handling device 10a. The carrier structure 22a preferably comprises base feet 64a, 66a (only two base feet are shown in FIG. 1, while the number of base feet shall not be limited thereto), via which bearing loads can be transferred to a ground which the handling device 10a is arranged on.

In the exemplary embodiment shown in FIGS. 1 to 3, the carrier element 24a extends at least partially transversally, in particular at least substantially perpendicularly, over the transport device 12a. In the exemplary embodiment shown in FIGS. 1 to 3, the longitudinal axis 26a of the carrier element 24a runs, in a plane extending at least substantially parallel to the product support surface 60a, at least substantially perpendicularly to the main transport direction 56a. The carrier element 24a may be embodied, for example, as a carrier bar, as a carrier beam, as a carrier cantilever, or as a different carrier element deemed expedient by someone skilled in the art. Preferably the carrier structure 22a comprises a longitudinal guiding arranged at the carrier element 24a, like for example a guide rail, a ball-guide rail, a roller guide, a dovetail guide, or the like, which forms a guiding track 46a of the handling unit 16a. The longitudinal guiding may be realized in a one-part implementation with the carrier element 24a, or the longitudinal guiding may be fastened at the carrier element 24a in a manner already known to someone skilled in the art, like for example screws, rivets or the like. The movement carriages 18a are preferably supported on the carrier element 24a such that they are movable relative to the carrier element 24a. Preferentially the movement carriages 18a are supported at the carrier element 24a so as to be movable via the longitudinal guiding translationally along the longitudinal axis 26a. The movement carriages 18a in each case comprise a bearing interface, which is realized correspondingly to the longitudinal guiding, like for example one or several rollers, a dovetail guide, sliding pieces or the like. The carrier element 24a may have a closed contour, which is in particular oval, round, polygonal or the like, or an open contour, in particular L-shaped, U-shaped, I-shaped, Z-shaped or the like. The longitudinal guiding preferentially has a contour that is at least substantially analogous to the contour of the carrier element 24a, in particular in order to enable a movement of the movement carriages 18a relative to the carrier element 24a along an at least substantially entire length of the longitudinal guiding.

The handling device 10a preferably comprises at least one electromagnetic drive unit 68a for an individual movement of the movement carriages 18a relative to the carrier element 24a. Preferably the electromagnetic drive unit 68a is realized as a linear motor system. Preferentially the linear motor system comprises, at least along the longitudinal axis 26a of the carrier element 24a, at least one stator 70a and a plurality of independently drivable translators 72a, 74a (see also FIG. 2a) which are arranged at the movement carriages 18a and are configured to drive the movement carriages 18a independently from one another. Preferably the stator 70a follows a contour of the longitudinal axis 26a of the carrier element 24a and/or a contour of the carrier element 24a itself. Preferentially the stator 70a at least section-wise comprises independently actuatable stator windings. It is possible, in a manner already known to someone skilled in the art, to create a magnetic traveling-wave field independently for each translator 72a, 74a situated in the influence range of the stator 70a. The translators 72a, 74a can be driven independently. Preferably the translators 72a, 74a comprise permanent magnets or are embodied as permanent magnets. In particular, at least two translators 72a, 74a are arranged on at least one movement carriage 18a. However, it is alternatively also conceivable that the handling device 10a comprises a different drive unit, deemed expedient by someone skilled in the art, for driving the movement carriages 18a relative to the carrier element 24a, like for example a toothed-rod drive unit, a belt drive unit, or the like.

The handling elements 20a are supported at the movement carriages 18a so as to be movable, in particular individually movable, the handling elements 20a in each case having at least one movement axis 30a, 32a that runs transversally to the longitudinal axis 26a of the carrier element 24a. The handling elements 20a are preferably embodied as vacuum grippers. It is however also conceivable that the handling elements 20a have a different implementation deemed expedient by someone skilled in the art, like for example an implementation as mechanical grippers, as magnetic grippers, or the like. Preferably the handling elements 20a in each case have at least two movement axes 30a, 32a, in particular a movement axis 30a and a further movement axis 32a. Preferentially the movement axes 30a, 32a of the handling elements 20a run in each case at least substantially perpendicularly to the longitudinal axis 26a of the carrier element 24a. In the exemplary embodiment illustrated in FIGS. 1 to 3, the movement axis 30a of the handling elements 20a for a movement of the handling elements 20a relative to the movement carriages 18a preferably runs in each case at least substantially parallel to the main transport direction 56a. The handling elements 20a are supported at the movement carriages 18a so as to be movable, in particular individually movable, translationally along and/or rotationally around the respective movement axis 30a. In the exemplary embodiment shown in FIGS. 1 to 3, the further movement axis 32a of the handling elements 20a, for an alternative or additional movement of the handling elements 20a relative to the movement carriages 18a, preferably runs in each case at least substantially perpendicularly to the product support surface 60a and to the longitudinal axis 26a of the carrier element 24a. The handling elements 20a are in the exemplary embodiment shown in FIGS. 1 to 3 supported at the movement carriages 18a so as to be at least translationally, in particular individually, movable along the respective further movement axis 32a. Alternatively or additionally it is conceivable that the handling elements 20a are supported at the movement carriages 18a so as to be, in particular individually, movable rotationally around the respective further movement axis 32a.

The handling unit 16a comprises fluidic, electrical and/or magnetic drives 42a (see FIG. 2a), in particular individual drives, for an, in particular individual, movement of the handling elements 20a relative to the movement carriages 18a along and/or around the movement axes 30a, 32a of the handling elements 20a, wherein respectively one drive 42a is arranged on a movement carriage 18a. In the exemplary embodiment illustrated in FIGS. 1 to 3, the handling unit 16a comprises fluidic drives 42a, in particular hydraulic or pneumatic cylinders, for a translational movement of the handling elements 20a along the respective movement axis 30a of the handling elements 20a (see FIG. 2a). It is however also conceivable that the handling unit 16a comprises electromagnetic drives, in particular electromagnetic drives assigned to a further linear motor system of the handling device 10a, which are configured for a translational movement of the handling elements 20a along the respective movement axis 30a of the handling elements 20a, alternatively to the fluidic drives 42a. The handling unit 16a preferably comprises electrical and/or magnetic drives 42'a, in particular electromotors, for a rotational movement of the handling elements 20a around the respective movement axis 30a of the handling elements 20a (see FIG. 2a). The handling unit 16a preferably comprises fluidic, electrical and/or magnetic drives 42"a, in particular electromotors or hydraulic or pneumatic cylinders, for a translational movement of the handling elements 20a along the respective further movement axis 32a of the handling elements 20a (see FIG. 2a). The handling device 10a comprises at least one sliding-contact-based or contactless, in particular inductive, energy supply unit 44a (see FIG. 2a) for an energy supply of the electrical and/or magnetic drives 42'a, the energy supply unit 44a being integrated at least partially in the carrier element 24a or at least partially integrated in the guiding track 46a of the handling unit 16a. Preferably the energy supply unit 44a comprises a plurality of energy pickups 76a, wherein in each case at least one energy pickup 76a is arranged on an individual movement carriage 18a (see FIG. 2a). The energy pickups 76a may be realized as sliding contacts, as coils or something like that. The energy supply unit 44a preferentially comprises an energy output element 78a which is, for example, embodied as a contact path, in particular as a copper path, as a coil or the like, and is arranged on the carrier element 24a and/or on the guiding track 46a (see FIG. 2a).

Figure 2A:
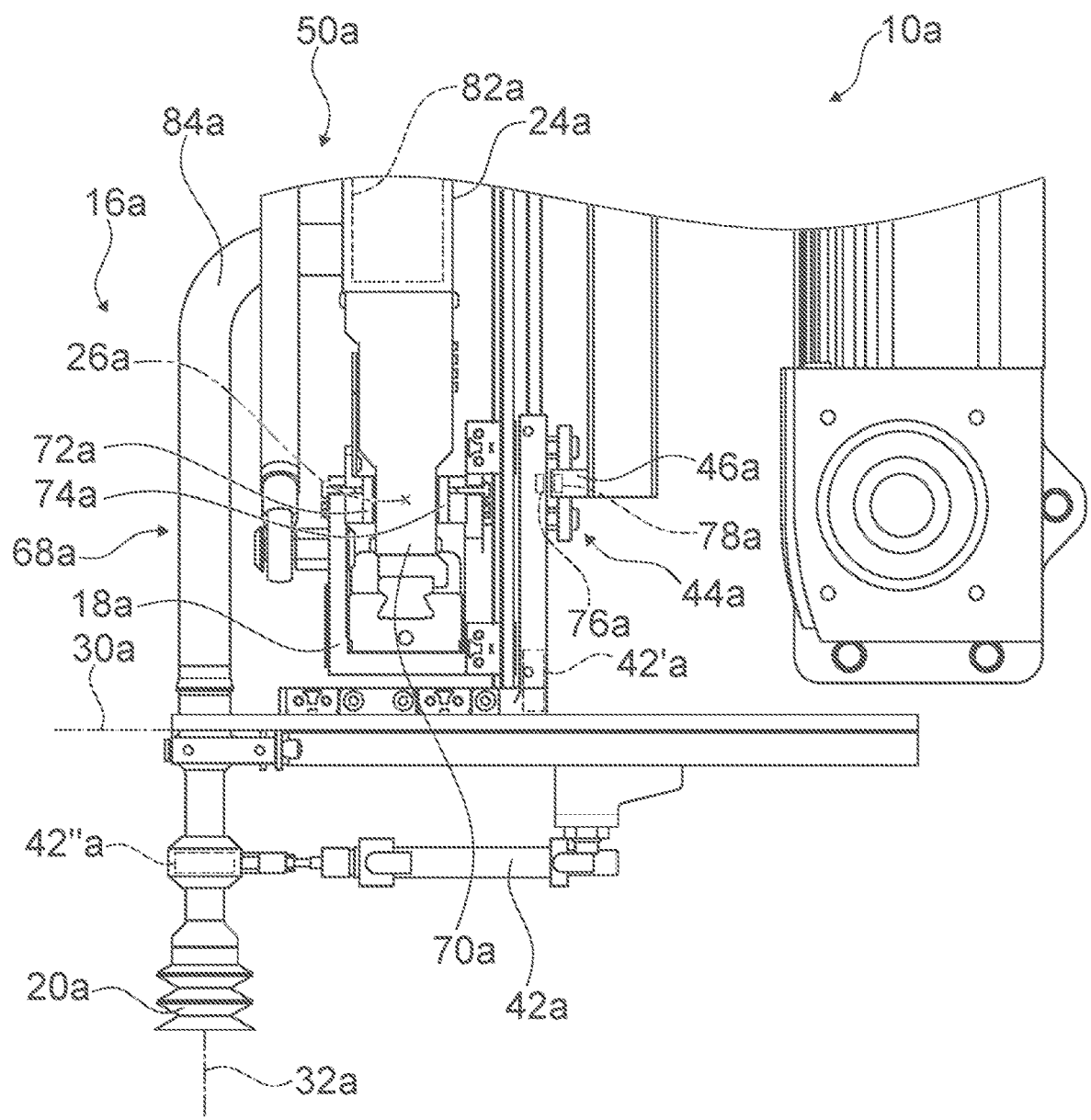
Figure 2B:
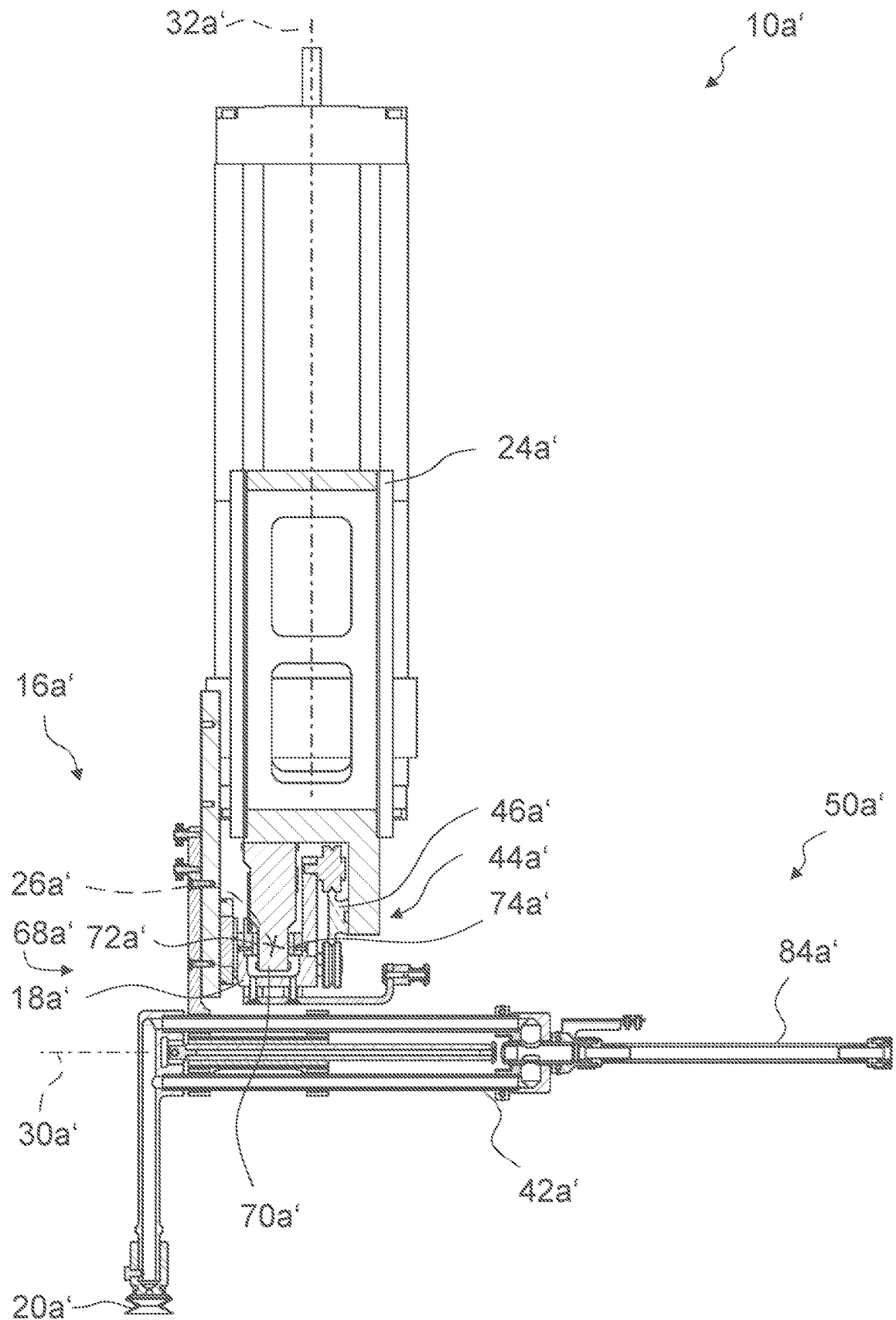

The handling device 10a comprises at least one vacuum unit 50a, which in particular is at least substantially without feed hose to the movement carriages 18a and/or the handling elements 20a (see FIG. 2a), for creating a negative pressure at the handling elements 20a for holding at least one product 14a at the handling elements 20a, the vacuum unit 50a being integrated at least partially in the carrier element 24a or at least partially in the guiding track 46a of the handling unit 16a. In FIG. 2a the vacuum unit 50a is shown, by way of example, to be partially integrated in the carrier element 24a. It is however also conceivable that, in particular analogously to an implementation of a vacuum unit known from the document DE 10 2016 225 820 A1, the vacuum unit 50a is integrated in the guiding track 46a. The vacuum unit 50a comprises a vacuum channel 82a, which is integrated in the carrier element 24a and is connected to a negative-pressure unit, like for example a compressor or the like, in a manner known to someone skilled in the art. The vacuum unit 50a comprises vacuum lines 84a (see FIG. 2a), which are connected with the individual handling elements 20a and with the vacuum channel 82a.

Alternatively or additionally to a movement of the handling elements 20a along and/or around the movement axes 30a, 32a, the carrier element 24a is supported movably. The carrier structure 22a comprises at least one bearing unit 34a, in particular a rotary bearing unit and/or a linear bearing unit, by means of which the carrier element 24a, in particular together with the movement carriages 18a arranged thereon, is supported so as to be vertically movable (see FIG. 2a, wherein the movement carriages 18a can be vertically movable relative to the carriage element 24a; see FIG. 2b, wherein the movement carriages 18a' can be vertically movable together with the carriage element 24a'; wherein the letter a has an apostrophe to distinguish the embodiments). The bearing unit 34a may be embodied as a rotary bearing unit and/or as a linear bearing unit. Preferentially the carrier element 24a is supported by the bearing unit 34a so as to be movable, in particular relative to a carrier frame 40a of the carrier structure 22a and/or to the transport device 12a, rotationally, in particular pivotably, around a movement axis 36a of the carrier element 24a and/or translationally along the movement axis 36a of the carrier element 24a. The carrier element 24a is supported by means of the bearing unit 34a at the carrier frame 40a of the carrier structure 22a so as to be vertically movable translationally along and/or rotationally around the movement axis 36a of the carrier element 24a, which runs transversally to the longitudinal axis 26a of the carrier element 24a.

The bearing unit 34a is preferably configured, in particular in addition to a vertically movable support of the carrier element 24a, for a horizontally movable support of the carrier element 24a. Preferentially the carrier element 24a is supported by the bearing unit 34a, in particular in addition to a movable support around and/or along the movement axis 36a of the carrier element 24a, so as to be movable rotationally, in particular pivotably, around a further movement axis 38a of the carrier element 24a and/or translationally along the further movement axis 38a of the carrier element 24a, in particular relative to the carrier frame 40a of the carrier structure 22a and/or to the transport device 12a (see FIG. 2a). The carrier element 24a, in particular together with the movement carriages 18a arranged thereon, is supported by the bearing unit 34a at the carrier frame 40a so as to be movable along the movement axes 36a, 38a of the carrier element 24a extending transversally to the main transport direction 56a and/or around the movement axes 36a, 38a of the carrier element 24a extending at least substantially parallel to the main transport direction 56a. The handling device 10a preferably comprises a carrier drive unit 80a (shown only schematically in FIG. 1) for an active movement of the carrier element 24a along and/or around the movement axes 36a, 38a of the carrier element 24a. The carrier drive unit 80a may be embodied as a hydraulic drive unit, as a pneumatic drive unit, as an electromotor, as a linear motor system or as a further carrier drive unit that is deemed expedient by someone skilled in the art.

The handling device 10a comprises at least one detection unit 48a (shown only schematically in FIG. 3) for a detection of orientations and/or positions of products 14a on the transport device 12a, the handling elements 20a being individually movable, relative to the movement carriages 18a, depending on orientations and/or positions of products 14a on the transport device 12d captured by the detection unit 48a, along and/or around the respective movement axis 30a, 32a of the handling elements 20a. Alternatively or additionally, the carrier element 24a is movable, relative to the carrier frame 40a and/or to the transport device 12a, depending on orientations and/or positions of products 14a on the transport device 12a along and/or around the movement axes 36a, 38a of the carrier element 24a. The detection unit 48a is preferably embodied as an optical detection unit, like for example as a camera unit, as a light barrier unit, or the like. Preferentially the detection unit 48a is configured for capturing a total width of the product support surface 60a, the detection unit 48a comprising at least one single detection element, in particular a single camera or a single optical sensor, for a capturing of the total width. It is however also conceivable that the detection unit 48a is configured to capture individual rows of products 14a on the product support surface 60a and in particular comprises one individual detection element per row. Preferentially, in particular viewed along the main transport direction 56a, the detection unit 48a is located upstream of the handling unit 16a.

Figure 4:
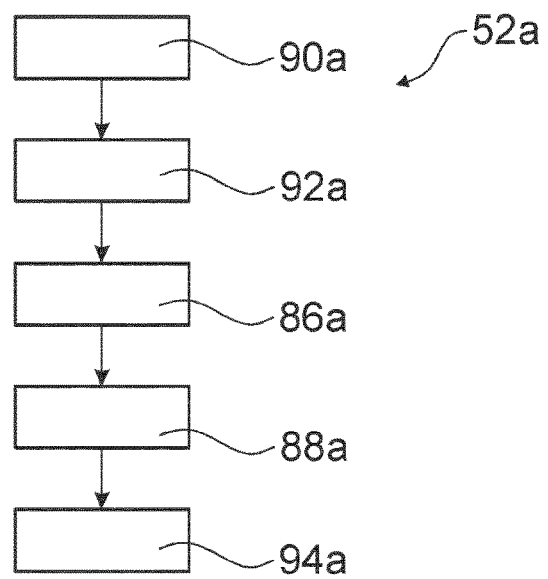

FIG. 4 shows a schematized flow of a method 52a for a handling of products 14a by means of the handling device 10a. In at least one method step 90a of the method 52a, orientations and/or positions of products 14a on the transport device 12a are detected by means of the detection unit 48a. In at least one method step 92a, the captured orientations and/or positions of products 14a are evaluated by means of a computing unit (not shown here in detail) of the handling device 10a. In at least one method step 86a the handling elements 20a of the handling unit 16a of the handling device 10a are moved, in particular individually, at the movement carriages 18a of the handling unit 16a along and/or around the movement axes 30a, 32a of the handling elements 20a extending transversally to the longitudinal axis 26a of the carrier element 24a, and/or the carrier element 24a, in particular together with the movement carriages 18a arranged thereon, is moved vertically. In at least the method step 86a, the handling elements 20a are moved, relative to the movement carriages 18a, depending on orientations and/or positions of products 14a on the transport device 12a captured by the detection unit 48a of the handling device 10a, individually along and/or around along and/or around the movement axes 30a, 32a of the handling elements 20a, and/or the carrier element 24a is moved along and/or around the movement axis 36a, 38a of the carrier element 24a, depending on orientations and/or positions of products 14a on the transport device 12a captured by the detection unit 48a of the handling device 10a. Preferably, in the method step 86a, a picking up of products 14a by means of the handling elements 20a is realized. It is conceivable that for a picking up of products 14a, the handling elements 20a are together moved by the carrier drive unit 80a as a result of a vertical movement of the carrier element 24a, or that the handling elements 20a are individually moved vertically along the movement axes 32a by the drives 42"a.

In at least one method step 88a of the method 52a, the movement carriages 18a are moved along the longitudinal axis 26a of the carrier element 24a and the products 14a held by the handling elements 20a are fed to a buffer (not shown here in detail) or to a packaging machine (not shown here in detail) via a further transport device 96a. With a feeding at least of individual products 14a to a buffer in the method step 88a, preferably an interim storage of products 14a is realized in the buffer, such that in case of incomplete loading of all handling elements 20a in the method step 86a, preferably additional products 14a from the buffer can be used such that always a given, in particular the same, number of products 14a is transferred when the products 14a are fed to the packaging machine. If it is determined in the method step 88a that a number of picked-up products 14a and a number of products 14a kept in the buffer will not be sufficient for transferring a given number to the packaging machine, in at least one method step 94a of the method 52a first the buffer is loaded before a transfer of products 14a to the packaging machine is realized. With regard to further method steps of the method 52a, the description of FIGS. 1 to 3 is referred to, which is analogously to be read also onto the method 52a, such that all features disclosed with respect to the packaging machine system 54a shall analogously also be considered as a disclosure with respect to the method 52a.

In FIGS. 5 to 13b further exemplary embodiments of the invention are shown. The following descriptions and the drawings are essentially limited to the differences between the exemplary embodiments, wherein regarding identically denominated components, in particular regarding components having the same reference numerals, principally also the drawings and/or the description of the other exemplary embodiments, in particular of FIGS. 1 to 4, may be referred to. For distinguishing the exemplary embodiments, the letter a has been added to the reference numerals of the exemplary embodiment in FIGS. 1 to 4. In the exemplary embodiments of FIGS. 5 to 13b the letter a has been replaced by the letters b to d.

Figure 5:
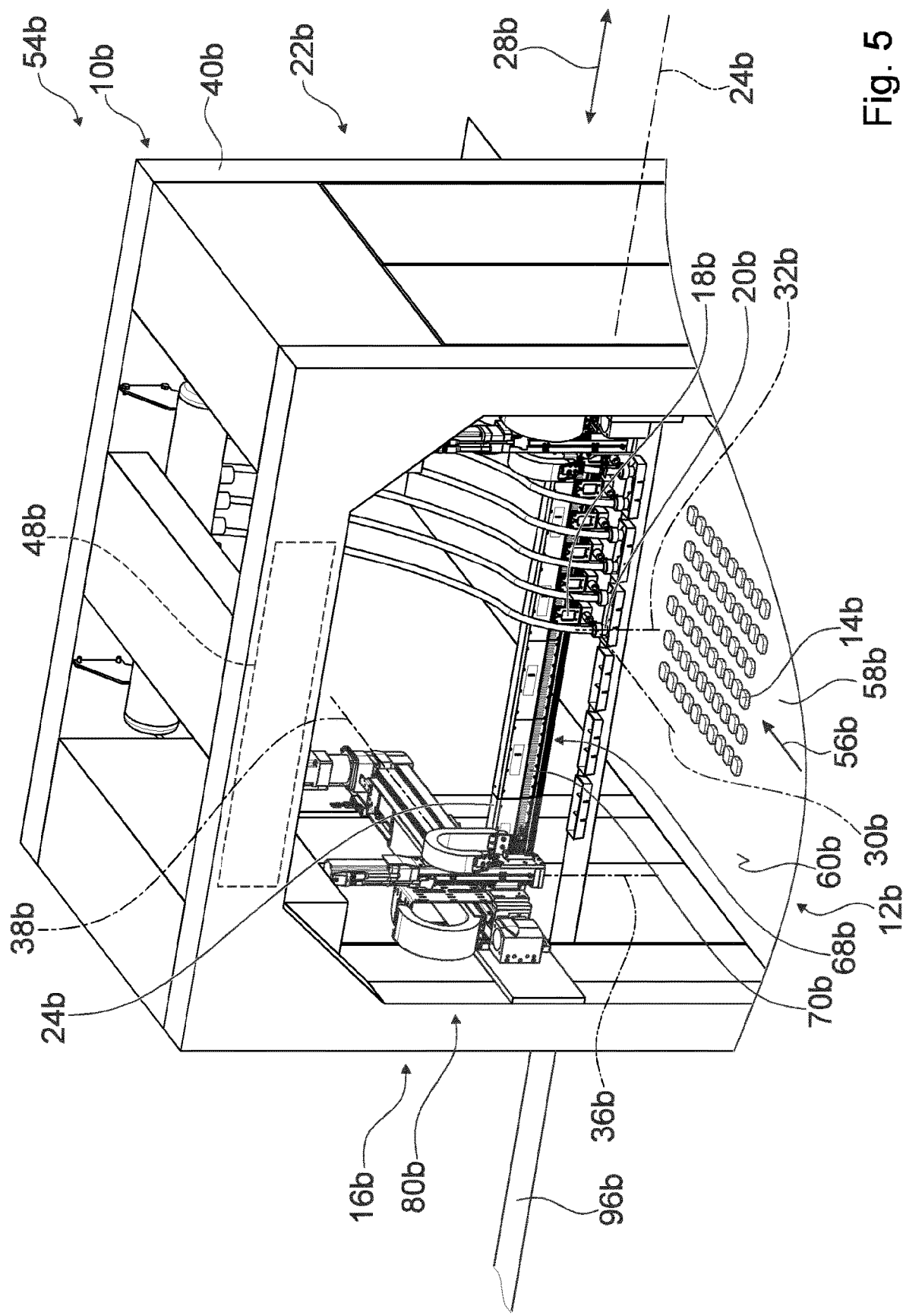

FIG. 5 shows an alternative packaging machine system 54b with a transport device 12b and with a handling device 10b for a handling of products 14b conveyed by means of the transport device 12b. The handling device 10b for a handling of products conveyed by means of the transport device 12b has at least one handling unit 16b comprising a plurality of movably supported movement carriages 18b, in particular movers, and a plurality of, in particular movably supported, handling elements 20b, in particular vacuum grippers, wherein on each movement carriage 18b respectively at least one handling element 20b is arranged. The handling device 10b further comprises at least one carrier structure 22b, in particular extending at least partially transversally over the transport device 12b, and comprising at least one carrier element 24b on which the movement carriages 18b are supported such that they are drivable independently from one another in terms of speed and/or position, at least along a direction 28b that runs at least substantially parallel to a longitudinal axis 26b of the carrier element 24b. The handling elements 20b are supported movably, in particular individually movably, at the movement carriages 18b, the handling elements 20b in each case having a movement axis 30b, 32b that runs transversally to the longitudinal axis 26b of the carrier element 24b. The carrier structure 22b comprises at least one bearing unit 34b, in particular a rotary bearing unit and/or a linear bearing unit, via which the carrier element 24b, in particular together with the movement carriages 18b arranged thereon, is supported so as to be vertically movable. In contrast to the exemplary embodiment described in FIGS. 1 to 4, the bearing unit 34b is embodied as a purely translational bearing unit. The carrier element 24b is supported by the bearing unit 34b along a movement axis 36b of the carrier element 24b so as to be vertically movable translationally along a direction that runs at least substantially perpendicularly to a product support surface 60b of the transport device 12b. The carrier element 24b is supported by the bearing unit 34b along a further movement axis 38b of the carrier element 24b so as to be horizontally movable translationally along a direction that runs at least substantially parallel to the product support surface 60b and to a main transport direction 56b of the transport device 12b. Regarding further features of the packaging machine system 54b, the description of FIGS. 1 to 4 is principally referred to, which—except for the differences mentioned—also applies at least substantially analogously to the exemplary embodiment illustrated in FIG. 5.

Figure 6:
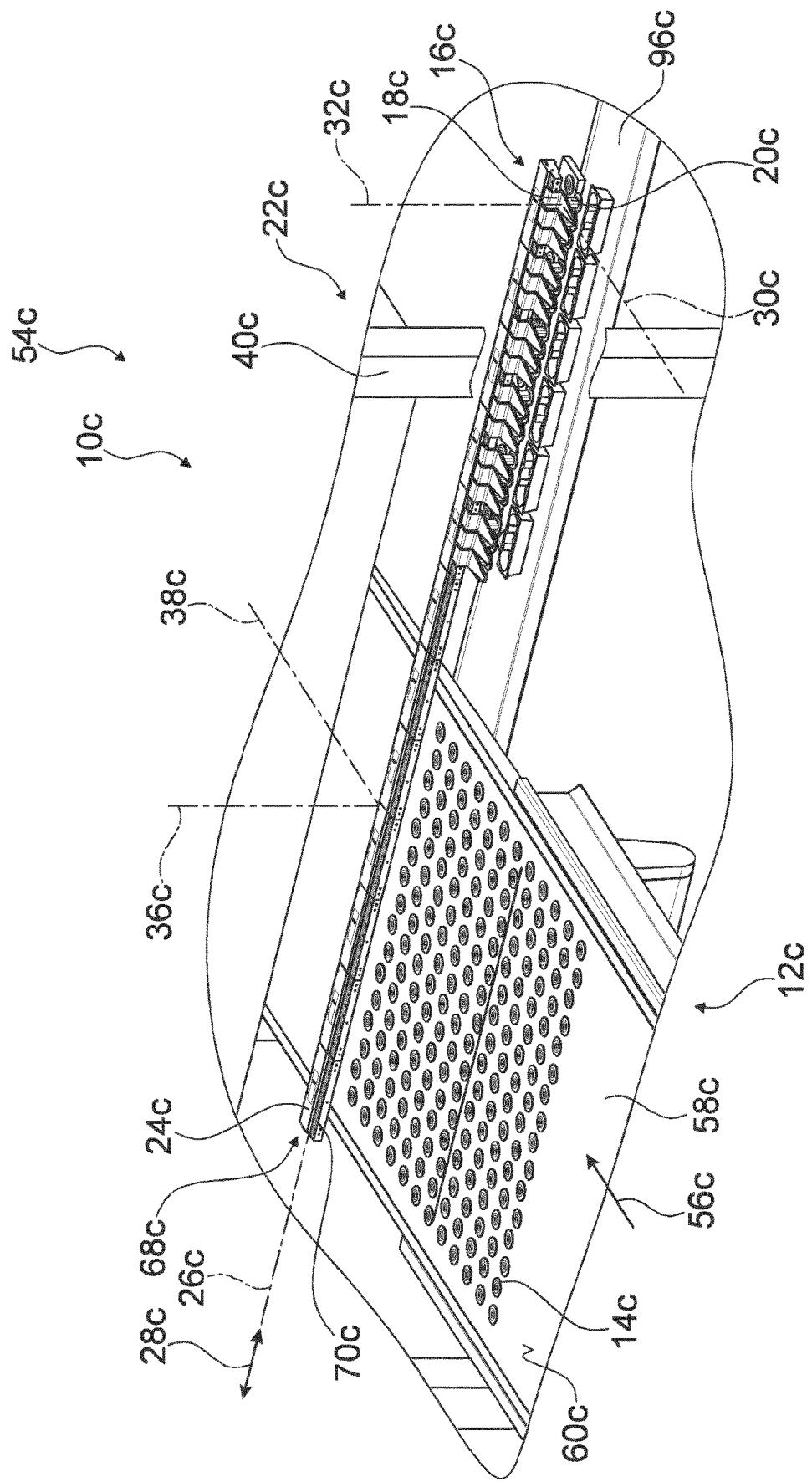

FIG. 6 shows a further alternative packaging machine system 54c with a transport device 12c and with a handling device 10c for a handling of products 14c conveyed by means of the transport device 12c. The handling device 10c for a handling of products 14c conveyed by means of the transport device 12c has at least one handling unit 16c comprising a plurality of movably supported movement carriages 18c, in particular movers, as well as a plurality of, in particular movably supported, handling elements 20c, in particular vacuum grippers, wherein on each movement carriage 18c in each case at least one handling element 20c is arranged. Furthermore, the handling device 10c comprises at least one carrier structure 22x, in particular extending at least partially transversally over the transport device 12c and comprising at least one carrier element 24c on which the movement carriages 18c are supported so as to be drivable independently from one another in terms of speed and/or position, at least along a direction 28c that runs at least substantially parallel to a longitudinal axis 26c of the carrier element 24c. The handling elements 20c are supported movably, in particular individually movably, at the movement carriages 18c, the handling elements 20c in each case having a movement axis 30c, 32c that runs transversally to the longitudinal axis 26c of the carrier element 24c. In contrast to the exemplary embodiment described in FIGS. 1 to 4, the carrier structure 22c is implemented to be free of a bearing unit, such that the carrier element 24c is arranged on a carrier frame 40c in a positionally fixed manner. Regarding further features of the packaging machine system 54c, the description of FIGS. 1 to 4 is principally referred to, which—except for the differences mentioned—also applies at least substantially analogously to the exemplary embodiment illustrated in FIG. 6.

Figure 7:
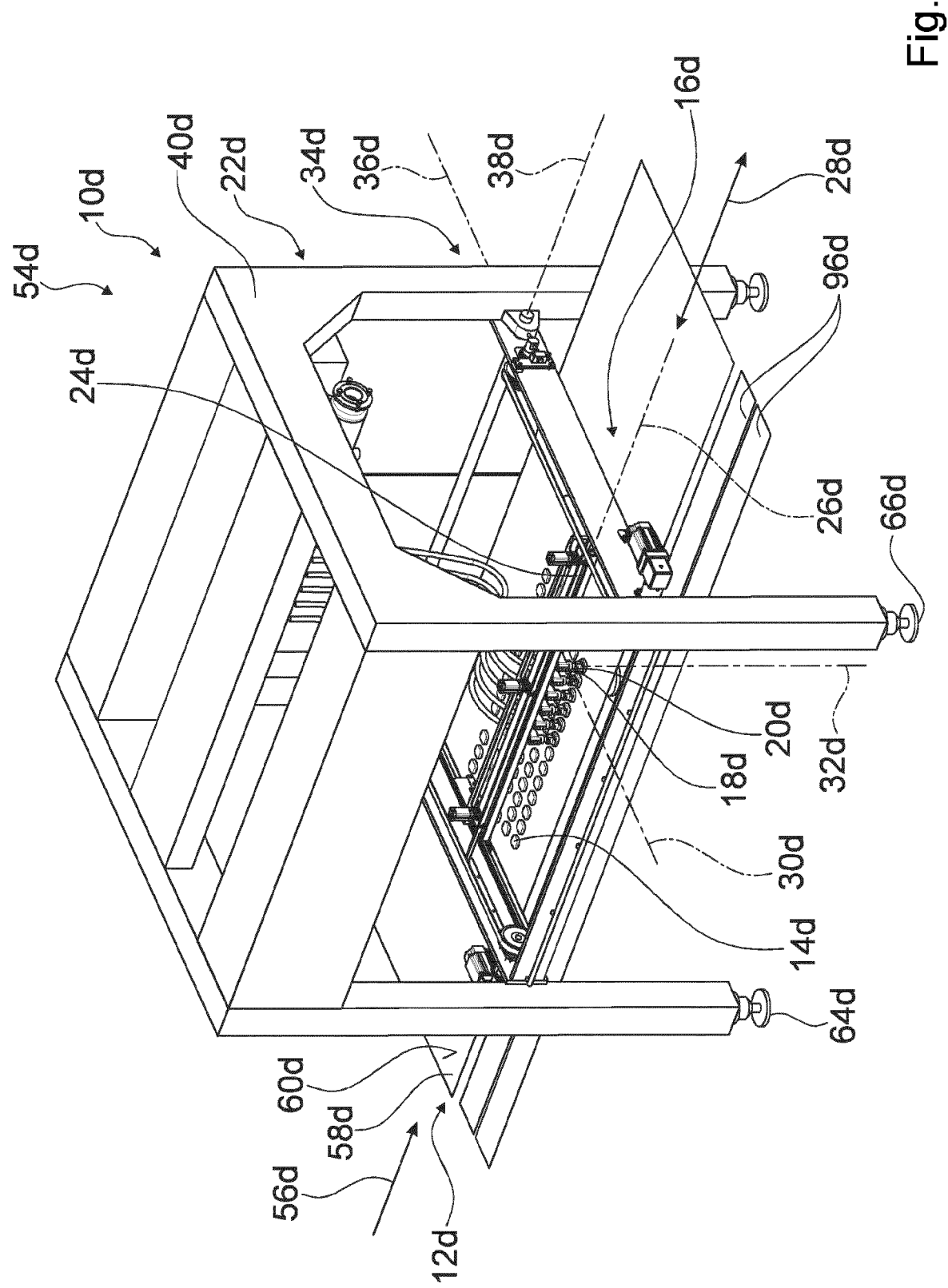
Figure 8:
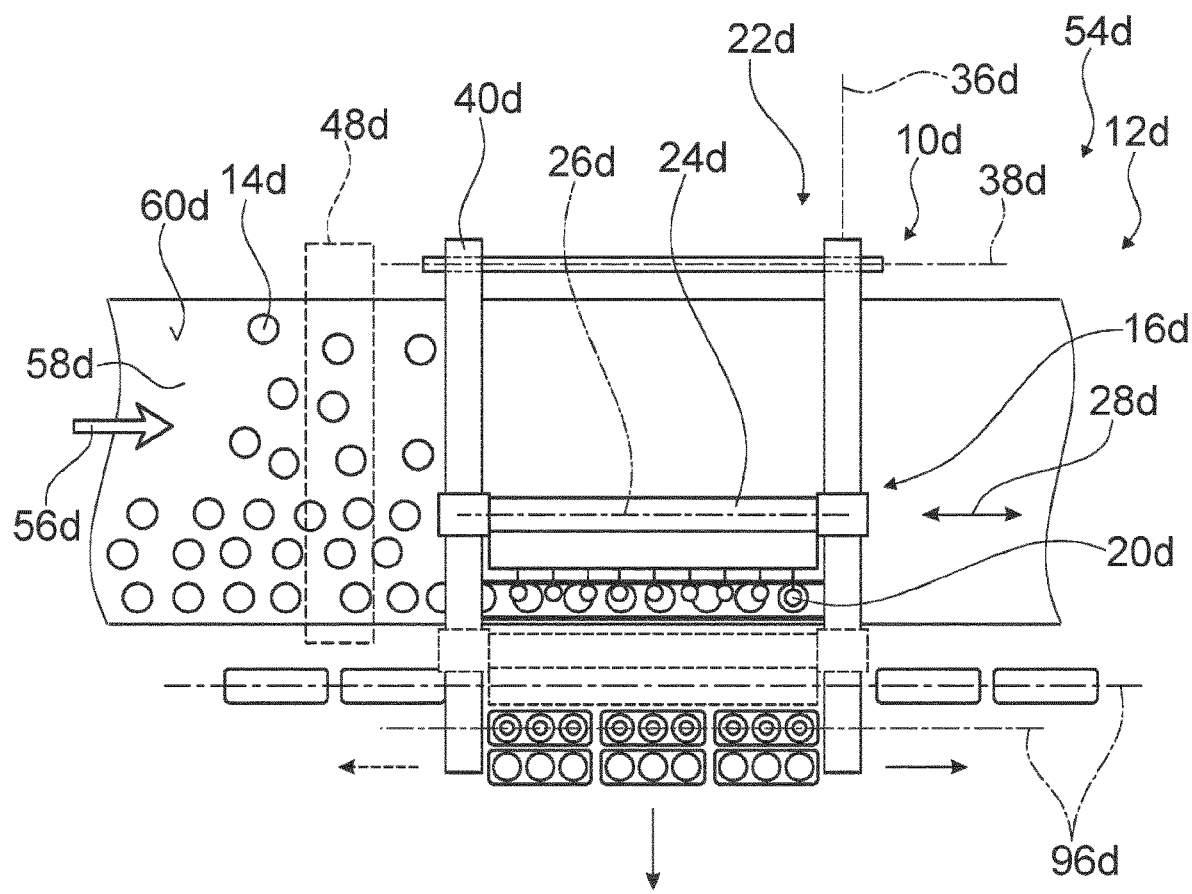

FIGS. 7 and 8 show an additional further alternative packaging machine system 54 d with a transport device 12 d and with a handling device 10 d for a handling of products 14 d conveyed by means of the transport device 12 d. The handling device 10 d for a handling of products 14 d conveyed by means of the transport device 12 d has at least one handling unit 16 d comprising a plurality of movably supported movement carriages 18 d, in particular movers, as well as a plurality of, in particular movably supported, handling elements 20 d, in particular vacuum grippers, wherein on each movement carriage 18 a at least one handling element 20 d is arranged. The handling device 10 d moreover comprises at least one carrier structure 22 d, in particular extending at least partially transversally over the transport device 12 d and comprising at least one carrier element 24 d on which the movement carriages 18 d are supported so as to be drivable independently from one another in terms of speed and/or position, at least along a direction 28 d extending at least substantially parallel to a longitudinal axis 26 d of the carrier element 24 d. The handling elements 20 d are supported movably, in particular individually movably, at the movement carriages 18 d, the handling elements 20 d in each case having a movement axis 30 d, 32 d that runs transversally to the longitudinal axis 26 d of the carrier element 24 d. The carrier structure 22 d comprises at least one bearing unit 34 d, in particular a rotary bearing unit and/or a linear bearing unit, by means of which the carrier element 24 d, in particular together with the movement carriages 18 d arranged thereon, is supported so as to be vertically movable. In contrast to the exemplary embodiment described in FIGS. 1 to 4, the carrier element 24 d, in particular the longitudinal axis 26 d of the carrier element 24 d, is oriented at least substantially parallel to a main transport direction 56 d of the transport device 12 d. The carrier element 24 d is supported by the bearing unit 34 d so as to be horizontally movable translationally along a direction that runs at least substantially parallel to a product support surface 60 d of the transport device 12 d and at least substantially perpendicularly to the main transport direction 56 d. The carrier element 24 d is supported by the bearing unit 34 d so as to be vertically movable rotationally around a direction that runs at least substantially parallel to the product support surface 60 d and to the main transport direction 56 d of the transport device 12 d. Regarding further features of the packaging machine system 54 d, the description of FIGS. 1 to 4 is principally referred to, which—except for the differences mentioned—also applies at least substantially analogously to the exemplary embodiment illustrated in FIGS. 7 and 8. For example, the products 14 d held by the handling elements 20 d are fed to a buffer (not shown here in detail) or to a packaging machine (not shown here in detail) via a further transport device 96 d.

Figure 9:
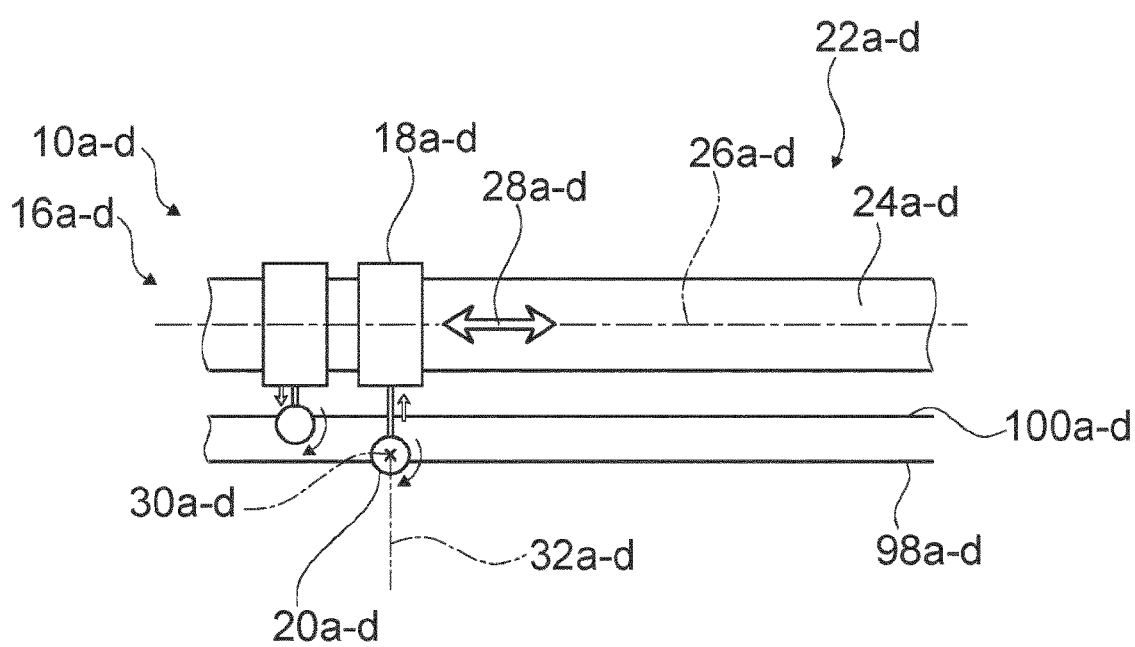

FIG. 9 shows a schematic illustration of movement options of handling elements 20a, 20b, 20c, 20d of handling units 16a, 16b, 16c, 16d of the handling devices 10a, 10b, 10c, 10d described in the descriptions of FIGS. 1 to 8. The handling elements 20a, 20b, 20c, 20d are supported movably, in particular individually movably, at movement carriages 18a, 18b, 18c, 18d of the handling units 16a, 16b, 16c, 16d, the handling elements 20a, 20b, 20c, 20d in each case having a movement axis 30a, 32a, 30b, 32b, 30c, 32c, 30d, 32d which runs transversally to a longitudinal axis 26a, 26b, 26c, 26d of a carrier element 24a, 24b, 24c, 24d and along which and/or around which the handling elements 20a, 20b, 20c, 20d are supported so as to be movable translationally and/or rotationally. The handling elements 20a, 20b, 20c, 20d are preferably movable translationally and/or rotationally from a picking-up plane 98a, 98b, 98c, 98d of the handling units 16a, 16b, 16c, 16d into a conveying-away plane 100a, 100b, 100c, 100d of the handling units 16a, 16b, 16c, 16d. In the picking-up plane 98a, 98b, 98c, 98d the handling elements 20a, 20b, 20c, 20d are preferably configured for picking up products (not shown in detail in FIG. 9). In the conveying-away plane 100a, 100b, 100c, 100d the handling elements 20a, 20b, 20c, 20d are preferably configured for a conveying away of the products along the longitudinal axis 26a, 26b, 26c, 26d of the carrier element 24a, 24b, 24c, 24d.

Figure 10:
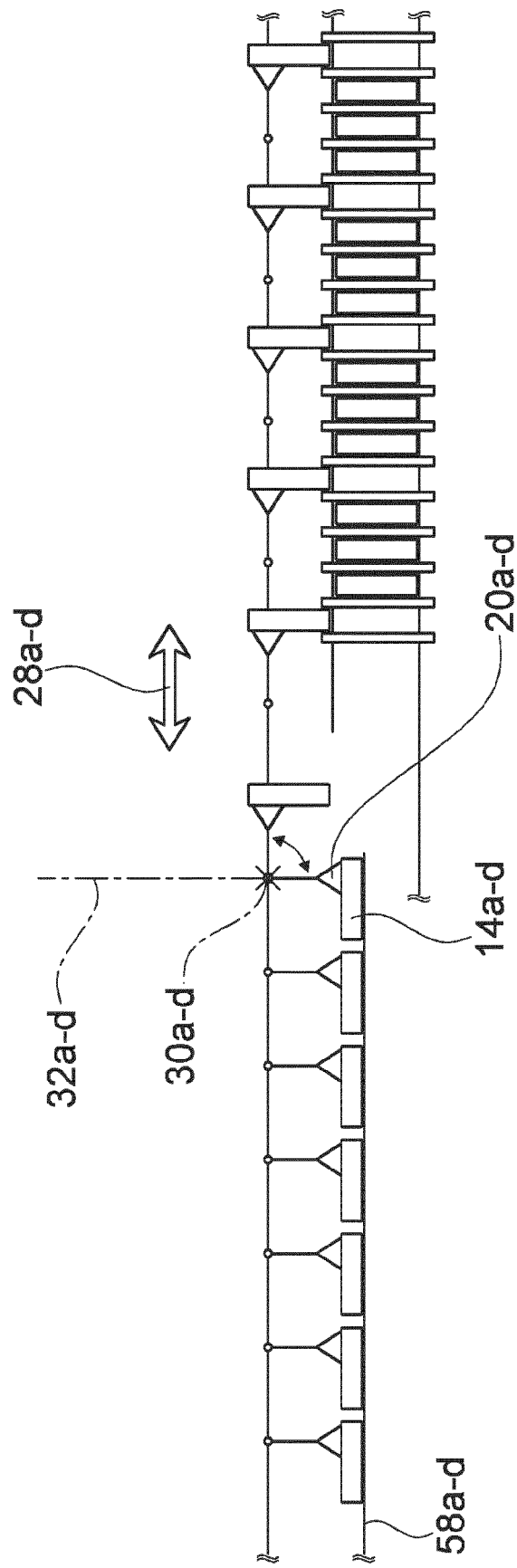

FIG. 10 shows a schematic illustration of a rotational movement option of handling elements 20a, 20b, 20c, 20d of handling units 16a, 16b, 16c, 16d of the handling devices 10a, 10b, 10c, 10d described in the descriptions of FIGS. 1 to 8. The handling elements 20a, 20b, 20c, 20d may be supported at movement carriages 18a, 18b, 18c, 18d of the handling units 16a, 16b, 16c, 16d so as to be, in particular individually, rotationally movable, in particular in order to pick up products 14a, 14b, 14c, 14d flatly in a picking-up plane 98a, 98b, 98c, 98d and after a rotation, in particular by 90°, to transport them away in an upright state and, for example, to transfer them into deposits in an upright state.

Figure 11:
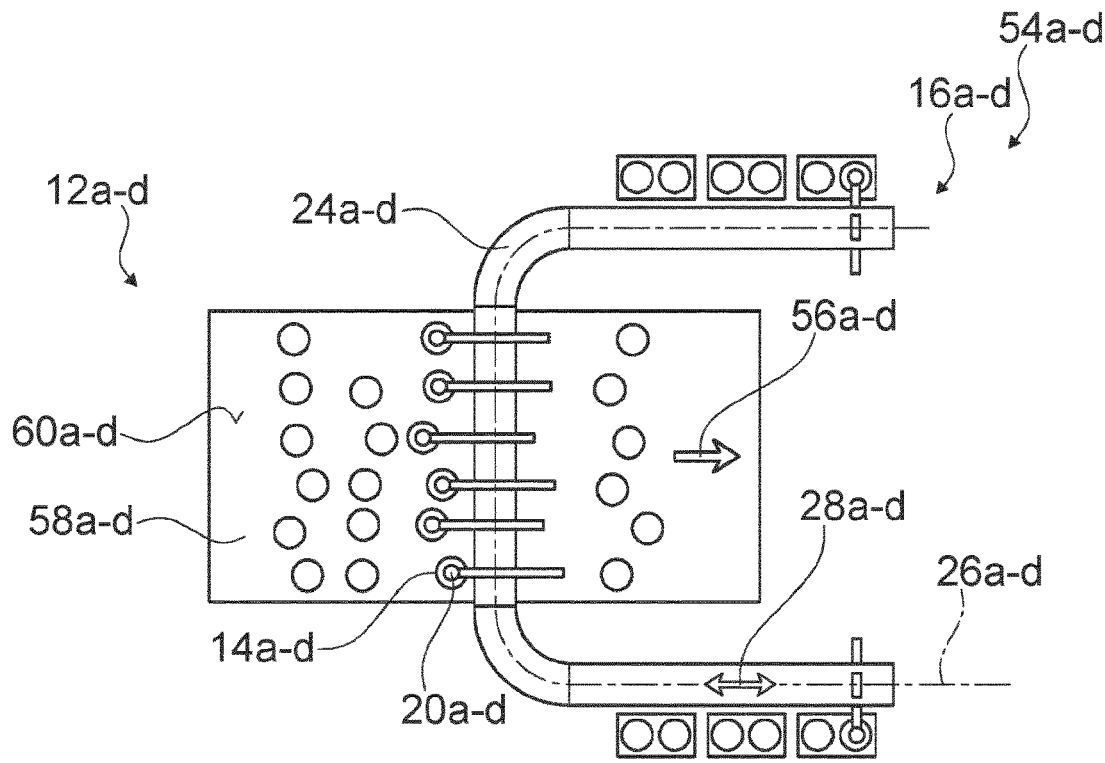

FIG. 11 shows a possible arrangement of a carrier element 24a, 24b, 24c, 24d of the handling devices 10a, 10b, 10c, 10d described in the descriptions of FIGS. 1 to 8. The carrier element 24a, 24b, 24c, 24d has, in particular viewed in a plane extending at least substantially parallel to a product support surface 60a, 60b, 60c, 60d, a U-shaped implementation, one leg of the carrier element 24a, 24b, 24c, 24d extending over a transport device 12a, 12b, 12c, 12d and two further legs of the carrier element 24a, 24b, 24c, 24d extending sidewise beside the transport device 12a, 12b, 12c, 12d, in particular being arranged on both sides of the transport device 12a, 12b, 12c, 12d.

Figure 12:
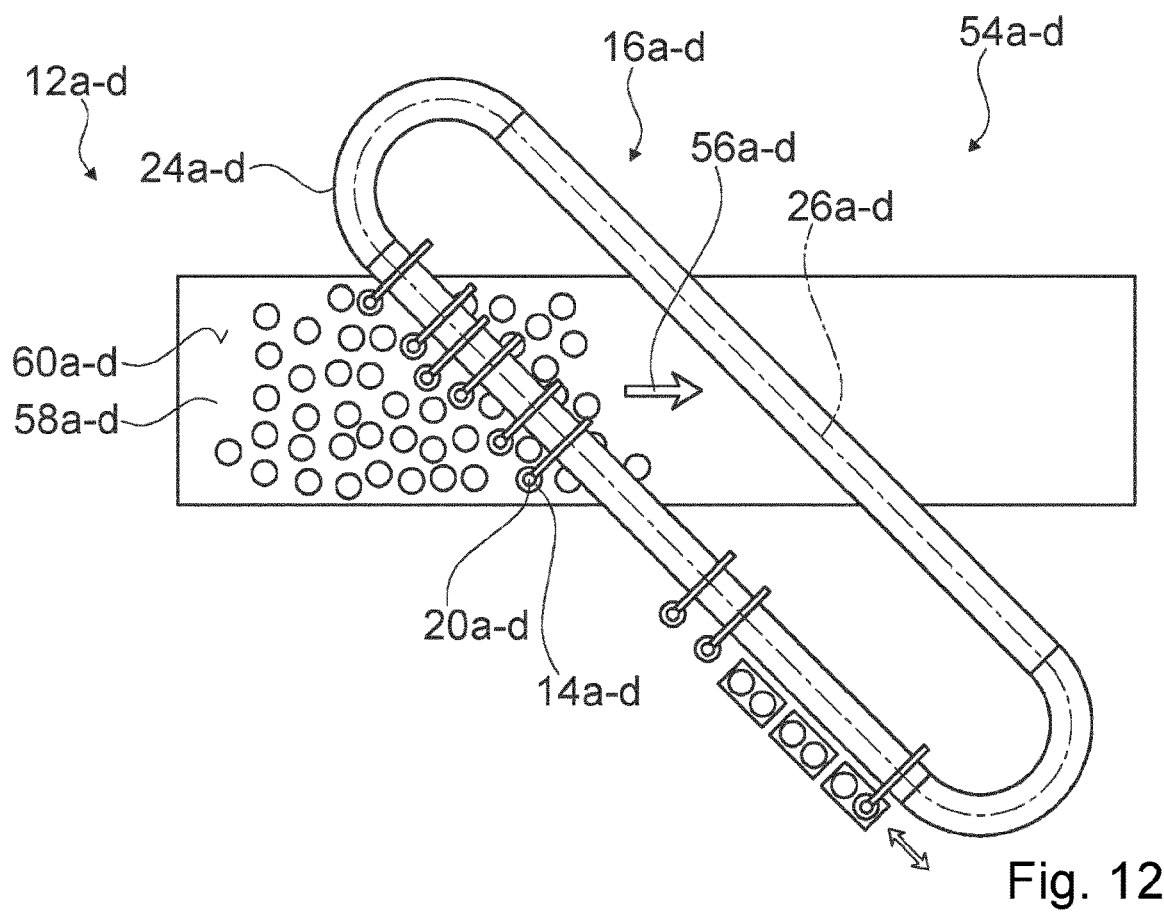

FIG. 12 shows a possible arrangement of a carrier element 24a, 24b, 24c, 24d of the handling devices 10a, 10b, 10c, 10d described in the descriptions of FIGS. 1 to 8. The carrier element 24a, 24b, 24c, 24d has, in particular viewed in a plane extending at least substantially parallel to a product support surface 60a, 60b, 60c, 60d, a closed contour, in particular an oval or elliptic contour, the carrier element 24a, 24b, 24c, 24d being arranged with respect to a transport device 12a, 12b, 12c, 12d) at an angle other than 90° relative to a main transport direction 56a, 56b, 56c, 56d of the transport device 12a, 12b, 12c, 12d. The carrier element 24a, 24b, 24c, 24d preferably extends over and beyond the transport device 12a, 12b, 12c, 12d on both sides. It is however also conceivable that the carrier element 24a, 24b, 24c, 24d extends over and beyond the transport device 12a, 12b, 12c, 12d only on one side.

Figure 13A:
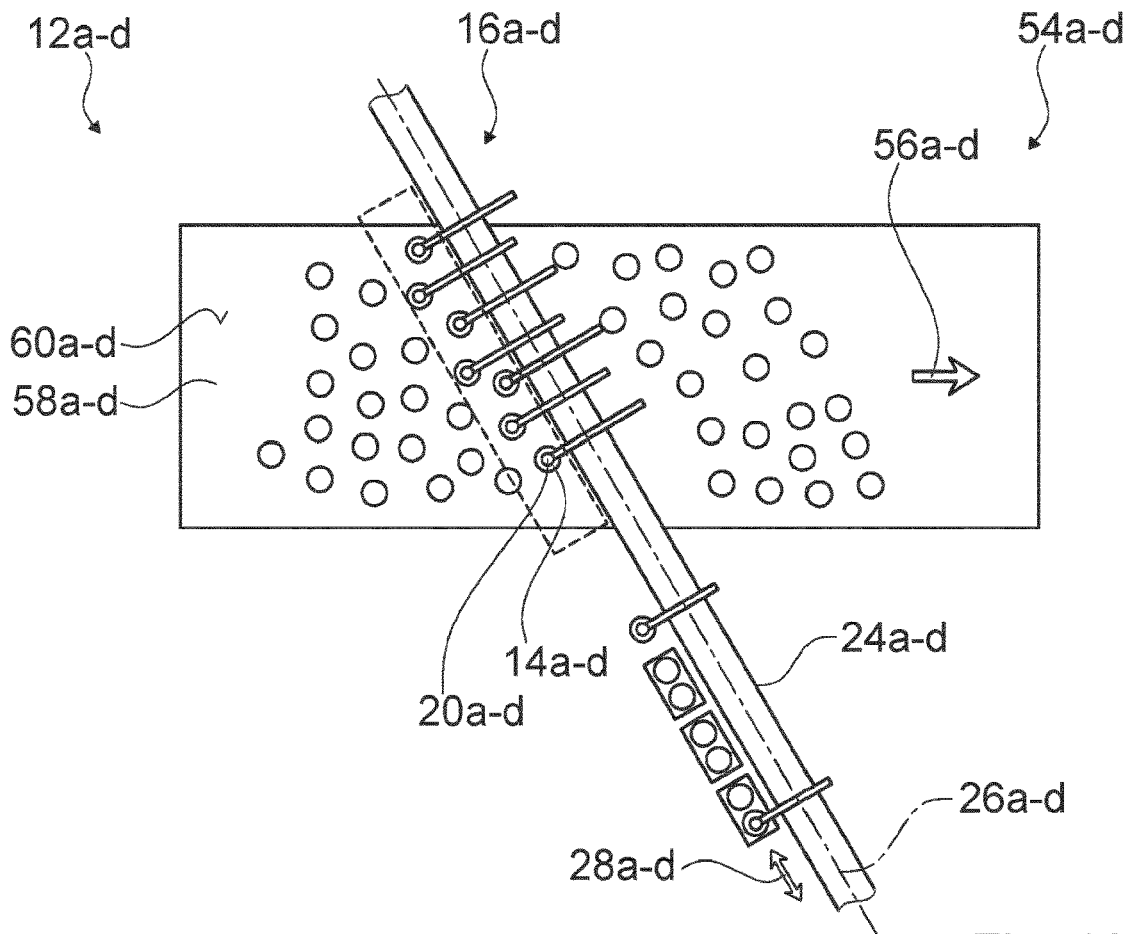
Figure 13B:
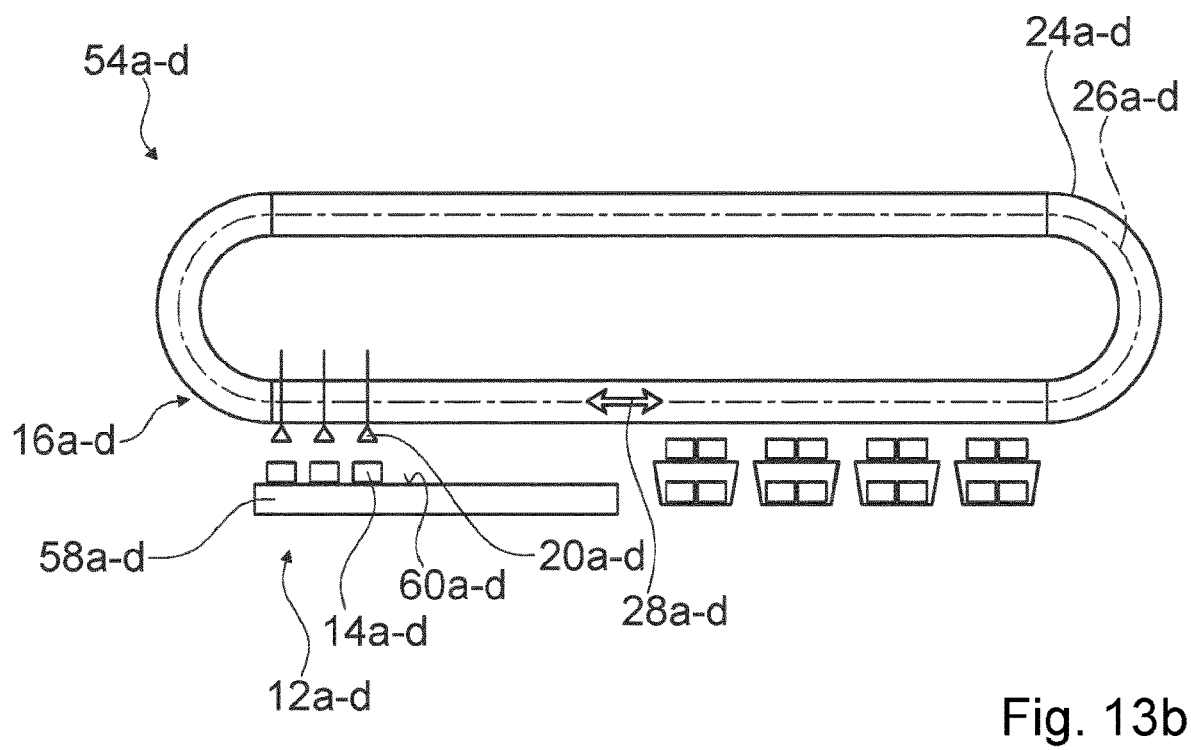

FIGS. 13a and 13b show an additional further arrangement of a carrier element 24a, 24b, 24c, 24d of the handling devices 10a, 10b, 10c, 10d described in the descriptions of FIGS. 1 to 8. The carrier element 24a, 24b, 24c, 24d has, in particular viewed in a plane that extends at least substantially perpendicularly to a product support surface 60a, 60b, 60c, 60d, a closed contour, in particular an oval or elliptic contour (see FIG. 13b). The carrier element 24a, 24b, 24c, 24d is preferably oriented vertically. The carrier element 24a, 24b, 24c, 24d preferably extends over and beyond the transport device 12a, 12b, 12c, 12d on both sides (see FIG. 13a). It is however also conceivable that the carrier element 24a, 24b, 24c, 24d extends over and beyond the transport device 12a, 12b, 12c, 12d only on one side (see FIG. 13b).

What is claimed is:

1. A handling device for a handling of products (14), which are conveyed by a transport device (12), with at least one handling unit (16) comprising a plurality of movably supported movement carriages (18), and a plurality of handling elements (20) which are embodied as vacuum grippers,
    wherein on each movement carriage (18) respectively at least one handling element (20) of the plurality of handling elements is arranged, with at least one carrier structure (22) having at least one carrier element (24) on which the movement carriages (18) are supported in such a way that they are drivable, independently from each other in terms of speed and/or position, at least along a direction (28) running at least substantially parallel to a longitudinal axis (26) of the at least one carrier element (24),
    wherein the plurality of handling elements (20) are supported on the movement carriages (18) so as to be movable, the plurality of handling elements (20) in each case having a movement axis (30, 32) that extends transversally to the longitudinal axis (26) of the at least one carrier element (24), and with at least one electromagnetic drive unit (68) for an individual movement of the movement carriages (18) relative to the at least one carrier element (24),
    wherein the at least one electromagnetic drive unit (68) is a linear motor system,
    wherein the at least one handling unit (16) comprises fluidic or electromagnetic drives (42) assigned to a further linear motor system of the handling device for a translational movement of the plurality of handling elements (20) along the respective movement axis (30) of the plurality of handling elements (20),
    wherein respectively one drive of the fluidic or electromagnetic drives (42) is arranged on a movement carriage (18),
    wherein the fluidic or electromagnetic drives (42) are configured at least for a movement of the plurality of handling elements (20) relative to the movement carriages (18) along a direction that runs at least substantially perpendicularly to the longitudinal axis (26),
    wherein the at least one carrier structure (22) comprises at least one bearing unit (34) by which the at least one carrier element (24) is supported so as to be vertically movable, and
    wherein for a movement of the plurality of handling elements (20) relative to the movement carriages (18), the movement axes (30) of the plurality of handling elements (20) in each case run at least substantially parallel to a product support surface (60) of the transport device (12).

2. The handling device according to claim 1, wherein the plurality of handling elements (20) are supported at the movement carriages (18) so as to be movable translationally along and/or rotationally around the respective movement axis (30, 32).

3. The handling device according to claim 1, wherein the at least one carrier element (24) is supported by the bearing unit (34) on a carrier frame (40) of the at least one carrier structure (22) so as to be vertically movable translationally along and/or rotationally around a movement axis (36, 38) of the at least one carrier element (24), which runs transversally to the longitudinal axis (26) of the at least one carrier element (24).

4. The handling device according to claim 1, characterized by at least one sliding-contact-based or contactless energy supply unit (44) for an energy supply of the fluidic or electromagnetic drives (42), the energy supply unit (44) being integrated at least partially in the at least one carrier element (24) or at least partially in a guiding track (46) of the at least one handling unit (16).

5. The handling device according to claim 1, characterized by at least one detection unit (48) for a detection of orientations and/or positions of products (14) on the transport device (12), wherein the plurality of handling elements (20) are individually movable, relative to the movement carriages (18), depending on orientations and/or positions of products (14) on the transport device (12) captured by the detection unit (48), along and/or around the respective movement axis (30, 32) of the plurality of handling elements (20).

6. The handling device according to claim 1, characterized by at least one vacuum unit (50) for creating a negative pressure at the plurality of handling elements (20) for holding at least one product (14) at the plurality of handling elements (20), the vacuum unit (50) being integrated at least partially in the at least one carrier element (24) or at least partially in a guiding track (46) of the at least one handling unit (16).

7. A method for a handling of products (14) by the handling device according to claim 1, wherein in at least one method step (86) the plurality of handling elements (20) of the at least one handling unit (16) of the handling device are moved at the movement carriages (18) of the at least one handling unit (16) along and/or around the movement axis (30, 32) of the plurality of handling elements (20) that runs at least substantially perpendicularly to the longitudinal axis (26) of the at least one carrier element (24) of the at least one carrier structure (22) of the handling device, wherein for a movement of the plurality of handling elements (20) relative to the movement carriages (18), the movement axes (30) of the plurality of handling elements (20) in each case run at least substantially parallel to the product support surface (60) of the transport device (12), wherein the individual movement of the movement carriages (18) relative to the at least one carrier element (24) is realized by the at least one electromagnetic drive unit (68) of the handling device that is embodied as a linear motor system, wherein a translational movement of the plurality of handling elements (20) along the respective movement axis (30) of the plurality of handling elements (20) is realized by the fluidic or electromagnetic drives (42) of the at least one handling unit (16) which are assigned to the further linear motor system of the handling device, wherein the respectively one drive of the fluidic or electromagnetic drives (42) is arranged on each movement carriage (18), and/or wherein at least in the method step (86) the at least one carrier element (24) of the at least one carrier structure (22) of the handling device is moved vertically together with the movement carriages (18) that are arranged thereon.

8. The method according to claim 7, characterized in that in at least the method step (86) the plurality of handling elements (20) are moved individually, relative to the movement carriages (18), depending on orientations and/or positions of products (14) on the transport device (12) captured by a detection unit (48) of the handling device, along and/or around the movement axes (30, 32) of the plurality of handling elements (20).

9. A packaging machine system with at least one handling device according to claim 1, and with at least one transport device (12) for a transport of products (14), wherein the transport device (12) has a main transport direction (56), wherein the handling device at least partially extends transversally over a transport element (58) of the transport device (12), wherein the plurality of handling elements (20) are supported at the movement carriages (18) movably along the movement axis (30) of the plurality of handling elements (20) which runs at least substantially parallel to the main transport direction (56), wherein the at least one carrier structure (22) comprises the at least the bearing unit (34) by which the at least one carrier element (24) is supported along a movement axis (36, 38) of the at least one carrier element (24) which runs transversally to the main transport direction (56), and/or around the movement axis (36, 38) of the at least one carrier element (24) which runs at least substantially parallel to the main transport direction (56).

* * * * *